United States Patent [19]
Amendt

[11] Patent Number: 6,001,044
[45] Date of Patent: *Dec. 14, 1999

[54] MOTOR VEHICLE

[75] Inventor: Oliver Amendt, Bühl-Vimbuch, Germany

[73] Assignee: Luk Getriebe-Systeme GmbH, Buhl/Baden, Germany

[ * ] Notice: This patent is subject to a terminal disclaimer.

[21] Appl. No.: 09/207,085

[22] Filed: Dec. 7, 1998

Related U.S. Application Data

[63] Continuation of application No. 08/769,500, Dec. 18, 1996, Pat. No. 5,871,419.

[30] Foreign Application Priority Data

Dec. 18, 1995 [DE] Germany ............................ 195 47 084

[51] Int. Cl.⁶ .................................................. B60K 23/00
[52] U.S. Cl. ............................................. 477/180; 701/67
[58] Field of Search ................................... 477/174, 180; 192/54.1, 109 F; 701/67, 68

[56] References Cited

U.S. PATENT DOCUMENTS

| | | | |
|---|---|---|---|
| 4,503,734 | 3/1985 | Acker | 701/67 |
| 4,899,858 | 2/1990 | Cote et al. | 701/67 |
| 5,065,849 | 11/1991 | Kono et al. | 701/68 |
| 5,067,599 | 11/1991 | Roder et al. | 477/180 |
| 5,322,150 | 6/1994 | Schmidt-brucken et al. | 701/68 |
| 5,335,174 | 8/1994 | Kohno et al. | 701/68 |
| 5,378,211 | 1/1995 | Slicker et al. | 477/180 |
| 5,411,124 | 5/1995 | Olson | 477/180 |
| 5,624,350 | 4/1997 | Bates | 477/180 |
| 5,679,098 | 10/1997 | Sheperd et al. | 477/180 |
| 5,690,581 | 11/1997 | Nadayoshi et al. | 477/180 |

*Primary Examiner*—Dirk Wright
*Attorney, Agent, or Firm*—Darby & Darby

[57] ABSTRACT

In a motor vehicle, a power train having a torque supplying prime mover, a torque receiving device, an automated system for the transmission of torque between the prime mover and the device, the system having a number of different positions of engagement including a starting position, means for ascertaining the starting position, and means for automatically regulating the transmission of torque by the system, including a control unit having means for generating output signals denoting the torque to be transmitted and being a function of at least the starting position, and means for adjusting the system in response to the output signals, the control unit further including means for memorizing a selected starting position, means for comparing the selected starting position with the ascertained starting position, and means for altering the memorized starting position in a stepwise fashion to at least approach the ascertained starting position when the memorized starting position departs from the ascertained starting position.

11 Claims, 13 Drawing Sheets

MOTOR VEHICLE

This application is a continuation of application Ser. No. 08/769,500 filed Dec. 18, 1996 now U.S. Pat. No. 5,871,419, which is hereby incorporated by reference herein in its entirety.

FIELD OF THE INVENTION

The invention relates to a motor vehicle with a driving unit and a transmission, as well as with an automated torque transmitting system.

BACKGROUND OF THE INVENTION

In motor vehicles of the above outlined character, the condition of engagement, or the setting, of the torque transmitting system (e.g., a clutch) or the torque which can be transmitted by the torque transmitting system is regulated and/or selected by a control unit and an adjusting or setting member; for example, a clutch can be actuated by a hydraulic system with a master cylinder and a slave cylinder as well as with an electric motor for the initiation of an actuation of the clutch. Such motor vehicles are known, for example, from the published German patent application No. 40 11 850.

For numerous modes of actuation of the torque transmitting system, it is advantageous (a) to know the desired clutch torque which has been selected in dependency on the distance covered by the means for actuating or adjusting the clutch and/or (b) to be in a position to relatively accurately select the torque which can be transmitted by the torque transmitting system. For example, a disengaging bearing can be utilized to set the torque transmitting system between a fully disengaged position or condition and a fully engaged position or condition. A play or idling distance or path exists between the fully disengaged position of the clutch and a position of engagement, called the "engagement" point or "gripping" point, when the torque transmitting system begins to transmit torque. As a rule, a progressively increasing transmission of torque takes place, as a function of the actuating path or movement of the clutch actuating means, such as a bearing, starting from the engagement point and terminating when the clutch is fully engaged. The engagement point denotes a condition of engagement of the clutch when the clutch begins to transmit torque or, alternatively, the engagement point can be defined as a position.

The knowledge or ascertainment of the engagement point is of utmost importance because the engagement point of a torque transmitting system, such as a clutch, characterizes that position of engagement or that extent of movement of the clutch engaging/disengaging means at which the transmission of torque begins, e.g., as a result of frictional engagement. If the characteristic curve of the clutch is known, and if the engagement point is also known, one can be said to have basically a full knowledge of the entire clutch characteristic.

In the course of its useful life and/or during the interval of actual use, the operation of a torque transmitting system such as, for example, a friction clutch, which is operated by a control unit and an adjusting member for the clutch, is subject to fluctuations which can have a number of different reasons or causes. For example, one reason for a shifting of the engagement point which actually exists in the clutch can be the increasing wear upon the component parts of the clutch, which wear takes place during the useful life of the clutch. An example of this type of wear would be the wear upon the friction linings. The changes which might develop or arise under such circumstances, such as in response to wear, settling phenomena or other change-causing processes, are changes which develop over relatively long periods and are of long duration. In addition, there can also develop relatively short-lasting fluctuations involving parts of the torque transmitting system, and the average duration of such relatively short-lasting changes can be in the range of from one or more seconds up to one or more hours. An example of a cause of short-lasting changes is the heating of component parts and the resulting thermal expansion of such component parts; these changes, too, can cause a shift in the position of the engagement point of the torque transmitting system.

SUMMARY OF THE INVENTION

An object underlying the invention is to provide a motor vehicle with an automatic torque transmitting system of the above outlined character which exhibits an improved or more satisfactory operational reliability and can be operated in a manner which does not cause discomfort to the occupant (s) of the vehicle.

Another object of the invention is to detect time-dependent changes in the entire torque transmitting system and to utilize a planned actuation or operation of the torque transmitting system, rather than having to resort to an expensive mechanical solution to the problem of avoiding or reducing the effect of undesirable influences of such changes. A further object of the invention is to provide a motor vehicle which employs an automated clutch capable of being actuated or controlled in an intelligent manner in order to at least reduce, or to completely avoid or eliminate, undesirable effects which are attributable to a shifting of the engagement point, such undesirable effects including for example a jerky movement during setting of the vehicle in motion or an insufficient acceleration of the motor vehicle or an abrupt excessive acceleration of the vehicle.

A further object of the invention is to provide a method of controlling or regulating the operation of a torque transmitting system which is utilized in a motor vehicle, the method being of such a nature that it permits a functionally reliable and comfortable operation of the motor vehicle.

In accordance with the invention, this is accomplished in motor vehicles of the type having a driving unit and a transmission in that the transmission of torque which can be transmitted by an automated torque transmitting system— such as a friction clutch—which may be, but is not required to be, installed in the path of torque transmission between the driving unit and the transmission, is controlled or regulated by a control unit. For example, the torque which can be transmitted by the torque transmitting system can be selected or set by at least one actuating member which can be operated by the control unit. For example, the positions or conditions of adjustment of the torque transmitting system can include a position such as a position of engagement.

It can also be advantageous or desirable to construct a motor vehicle of the type having a driving unit, a transmission and an automated torque transmitting system, as well as a control unit which controls or regulates the torque adapted to be transmitted by the torque transmitting system, in such a way that the torque which can be transmitted can be set or selected by way of, for example, a position, such as a position of engagement, by means of an actuating, setting or adjusting member which is actuatable by the control unit. The control unit can detect or ascertain and/or store in memory an engagement point of the torque transmitting system, at least in one operating point. The engagement point characterizes a position or condition of engagement at which the transmission of torque basically begins.

The stages of operation constitute different operating points of the motor vehicle, and such operating points are distinguishable from each other on the basis of vehicle parameters.

In accordance with a further advantageous embodiment of the invention, it can be advantageous or desirable if an automated torque transmitting system is designed in such a way that its engagement point is adapted at least in one operating point.

Moreover, it can be advantageous to further develop an embodiment of the invention in such a way that the engagement point of the torque transmitting system can be adapted in at least one operating point in that a stored value of the engagement point can be utilized or processed by the control unit to at least approximate, conform to or equal an actual or real physical value of the engagement point.

The value (signal) which is stored by the control unit as a value denoting the engagement point and which is thereupon treated by the control unit as a value being representative of the engagement point during setting or adjustment of the clutch, need not be that value which has been determined as the engagement point because the value denoting the engagement point, such as the value of the physical (actual) engagement point can be filtered, etc. Furthermore, the value which is stored as the engagement point can be a value which deviates from the ascertained value of the engagement point and can be determined as a value corresponding to that of the last stored engagement point plus a differential amount. Thus, one should distinguish between an actually existing engagement point and a value of the engagement point which is used by the control unit to actuate the torque transmitting system. The actual and stored values of the engagement point can be different, i.e., they need not necessarily be the same.

It is advantageous if the value of the physical engagement point, such as a position or condition of engagement of the torque transmitting system when the transmission of torque begins is directly or indirectly determinable or deducible on the basis of measurements or calculations.

It can also be advantageous if a position or condition of engagement is identified by the control unit as an engagement point and, basically, the value of the thus determined position of engagement is stored as the value of the engagement point.

It is also advantageous if the value which is stored as an engagement point stems or originates from a value which has been determined as an engagement point, and it can be of further advantage if the stored value is derived from a mathematical operation, such as for example addition, from the value which has been determined as an engagement point. For example, the increment/decrement for the adaptation of the engagement point can be derived, among others, from the actually ascertained operating point.

It is also advantageous or desirable if the value which is stored as an engagement point is ascertainable on the basis of at least one value of the clutch torque which can be transmitted in at least one preselectable position of engagement.

Moreover, it can be advantageous or desirable when the value of a clutch torque which can be transmitted by the torque transmitting system and/or a difference between such values can be ascertained on the basis of at least one value of engine torque and/or on the basis of a difference between engine torques.

Still further, it can be advantageous or desirable if, in accordance with a novel concept presented herein, a motor vehicle is equipped with a driving unit, a transmission, and an automated torque transmitting system, such as a friction clutch, which may be, but is not required to be, in the path of torque transmission between the driving unit and the transmission, and if the torque which is adapted to be transmitted by the torque transmitting system is regulated through a position of engagement by means of a control unit, which unit controls at least one adjusting or actuating member of the clutch, in such a way that the engagement point of the torque transmitting system is adapted at least at one operating point.

Furthermore, it can be advantageous if a motor vehicle is equipped with a driving unit, a transmission, a torque transmitting system—such as a friction clutch—which may be, but is not required to be, in the path of torque transmission between the driving unit and the transmission, and with a control unit which is in a signal-receiving connection with at least one sensor and regulates or controls the torque adapted to be transmitted by the torque transmitting system in dependency upon the operating point and/or as a function of time. The engagement point—which denotes the position of engagement when the transmission of torque begins—is adapted in such a way that at least one set of data, which pertains to the engagement point, and which is utilized by the control unit and stored in at least one memory is caused to at least approximate, at least stepwise, the at least one physically prevailing engagement point.

In accordance with a further inventive concept, it can be advantageous or desirable in a motor vehicle of the type having a driving unit, a transmission, an automated torque transmitting system, such as a friction clutch, which may be, but is not required to be, disposed in the path of torque transmission, and at least one control unit as well as at least one actuating member which is actuatable by the control unit and which serves to select the torque capable of being transmitted by the torque transmitting system in such a way that the torque which is capable of being transmitted by the torque transmitting system can be set to be anywhere between a value corresponding to full disengagement of the clutch (when the torque capable of being transmitted is zero) and full engagement of the clutch in which the transmissible torque rises to a maximum value, if the physically existing engagement point, which point characterizes the position or condition of engagement when the transmission of torque begins, is compared to an intentional actuation effected by the control unit as a function of time and/or as a function of the operating point with at least one set of data pertaining to the engagement point and being stored in a memory and the set of data is adapted, at least in a stepwise fashion, when the physical engagement point deviates from the set of data pertaining to the stored engagement point.

It is further advisable to design a novel embodiment of a motor vehicle of the type having a driving unit, a transmission, an automated torque transmitting system—such as a friction clutch—which may be, but is not required to be, in the path of torque transmission, and at least one control unit as well as at least one actuating member which is actuatable by the control unit and serves to select the torque capable of being transmitted by the torque transmitting system in such a way that the torque which is capable of being transmitted by the torque transmitting system can be selected to be anywhere between a value corresponding to full disengagement of the clutch (when the torque capable of being transmitted is zero) and full engagement of the clutch in which the transmissible torque rises to a maximum value, in such a way that one carries out at least one of the following adaptations of the engagement-point:

an adaptation of the engagement point attributable to long-lasting changes in the power train or in the torque transmitting system such as, for example, the wear upon the friction linings an adaptation of the engagement point due to short-lasting changes of the engagement point due to short-lasting changes in the power train or in the torque transmitting system, such as for example thermal fluctuations of the torque transmitting system.

It can be of advantage if the engagement point is adapted by resorting to an intentional adjustment or actuation of the torque transmitting system and a detection or ascertainment of magnitudes in several steps.

It is of advantage if, in at least one of the selected or completed steps, there is adopted a measured value which at least represents the engine torque.

It can equally be of advantage if, in at least one of the selected or completed steps there is carried out a setting of the clutch position with a predeterminable desired clutch torque, the setting of the clutch being determined with the preselectable desired clutch torque by resorting to a stored characteristic curve of the clutch and to the stored value of the engagement point.

It can also be advantageous or desirable if, in at least two of the selected or completed steps, such as in between measurements, one ascertains measured values which at least represent or approximate the engine torque, and at least one further step involves a setting of a clutch position or condition with a preselectable desired or required clutch torque and the desired clutch torque is ascertained, selected or determined by resorting to a stored characteristic curve of the clutch and to the stored value of the engagement point.

It can be advantageous when such measured values are utilized to form average values of data per measurement interval and if at least one other step involves carrying out a selection of the condition of the clutch with a corresponding desired clutch torque.

An embodiment can be advantageously selected in such a way that the at least two measurement intervals take place at different positions of the clutch or at different clutch torques.

It is advantageous to select an embodiment in such a way that the at least two measured values or magnitudes are determined or ascertained at differently selected clutch positions or conditions or at different preselectable clutch torques.

It can be of advantage if the measured values or magnitudes during the two measurement intervals are determined or calculated in different positions of the clutch or at different clutch torques, i.e., that the measured values are determined at different desired or required clutch torques. For example, the measured values or magnitudes can constitute values denoting the engine torque or values which denote or represent such engine torque.

It can be advantageous if average values of data are determined or calculated per measuring interval by resorting to the aforementioned data, such as measured values or magnitudes.

It can also be advantageous if the engagement point of the torque transmitting system is ascertained or calculated by resort to at least one measured value of a magnitude denoting the engine torque, at least at one selected position of the clutch or at a desired clutch torque.

It can also be advantageous or desirable that the ascertained value of the engagement point be compared with a stored value of an engagement point.

It is also of advantage if a further embodiment of the invention provides that the ascertained value of the engagement point be compared with a stored value of an engagement point and, when a detectable, predetermined or given difference exists between the two values, the stored value is altered.

Furthermore, it might be desirable that the stored value be changed at least in such a way that the stored value at least approximates the ascertained value.

In accordance with a further inventive concept, it can be advantageous if the stored value is changed at least in such a way that the stored value is caused to approach the ascertained value at least in a stepwise fashion with steps of predetermined length.

It can be advantageous if the stored value is caused to come nearer to the ascertained value with steps of preselectable length, the length of the steps being preselectable or having a functional relationship with the divergence.

It can be of equal advantage when the selection of the clutch torque by way of the control unit in at least one operating point is carried out in such a way that:

a) the clutch torque is selected for a preselectable clutch position or at a preselectable desired clutch torque b) a first phase involves determining measured values of a parameter which denotes the engine torque and, if necessary or desired, an averaging of the thus determined values, c) a second phase involves the setting of a preselectable clutch position or of a preselectable desired clutch torque, d) a third phase involves the ascertaining of the measured values of a parameter representing the engine torque and, if necessary or desired, an averaging of the value, e) carrying out a comparison at least between those values of the steps a) and c) which denote the engine torque and the values of the desired clutch torque, and f) altering the stored engagement point in dependency upon the above.

Still further, it might be advantageous—in accordance with a novel concept presented herein—if the selection or setting of the clutch torque for the purpose of ascertaining the engagement point and/or for the purpose of adapting the engagement point by way of the control unit in at least one operating point is carried out in such a way that:

a) the clutch torque is selected in a preselectable set clutch position or at a preselectable set desired clutch torque, which is determinable on the basis of the stored value of the engagement point and a characteristic curve of the clutch, b) measured values of a magnitude denoting the engine torque are determined within a preselectable time window and, it necessary or desired, such measured values are averaged, c) a further phase involves the setting of a further preselectable clutch position or a further preselectable clutch torque, d) a further phase or stage involves the ascertaining of measured values of a magnitude representing the engine torque, such measured values being, averaged if desired or necessary, e) one carries out a comparison at least between those values of the steps b) and d) which denote or represent an engine torque and the values of the desired clutch torque as ascertained in the steps a) and c), f) one carries out an evaluation whether a deviation between at least one engine torque and at least one desired clutch torque exceeds a preselectable threshold value, and g) if necessary, the stored engagement point is altered in dependency upon the comparison or in dependency upon the deviation.

It can be advantageous if the setting of the clutch torque by way of the control unit in at least one operating point is carried out in such a way that:
a) the clutch torque is selected for a preselectable position of the clutch or at a preselectable desired clutch torque
b) a first phase involves the ascertaining of measured values which denote a magnitude representing the engine torque, such measured values being averaged if desired or necessary,
c) a second phase involves the setting of a preselectable position of the clutch or of a preselectable desired clutch torque,
d) a third phase involves the determination of measured values denoting a magnitude which represents the engine torque, such measured values being averaged if desired or necessary,
e) a comparison is carried out at least between those values of the steps a) and c) which denote the engine torque and the values of the desired clutch torque, and
f) in the event of a departure of the difference from a preselectable tolerance, the engagement point is altered incrementally/decrementally and stored, and the procedure is carried out anew from the step a) on.

Still further, it can be advantageous when the setting of the clutch torque by way of the control unit in at least one operating point is carried out in such a way that:
a) the clutch torque is selected for a first preselectable position of the clutch or at a preselectable desired clutch torque
b) a first stage involves determining measured values of a magnitude representing the engine torque and, if necessary or desirable, such measured values are averaged,
c) a second phase involves the setting of a preselectable position of the clutch or a preselectable desired clutch torque,
d) a third phase involves ascertaining measured values of a parameter representing the engine torque and, if necessary, such measured values are averaged,
e) a comparison is carried out at least between those values of the steps a) and c) which represent an engine torque and the values of the desired clutch torque, and
f) the engagement point is altered incrementally/decrementally in the event of departure of the difference from a preselected tolerance, the altered engagement point is stored and the procedure is repeated from c) on but resort may still be had to the data of the steps a) and b).

Furthermore, it can be advantageous if the selection of the clutch torque by way of the control unit, at least in one operating point, is carried out in such a way that, in a first phase, one determines measured values of a parameter representing the engine torque and such measured values are averaged, a second phase involves the setting of a clutch torque, a third phase involves the ascertaining and the averaging of measured values denoting a parameter which represents the engine torque, one carries out a comparison at least between the averaged values denoting the engine torque and the values denoting the clutch torque, and the stored engagement point is altered in dependency upon such comparison.

It is of particular advantage if the values, such as measured values, denoting the parameter which represents the engine torque and the values denoting the clutch torques are used to ascertain a difference between the measured values of a parameter denoting the engine torque and if one ascertains the difference between the values of the clutch torque, if such differences are compared and, in the event of lack of equality or in response to the exceeding of a predetermined departure, at least one stored value of the engagement point is altered in accordance with the extent of inequality between the differences or in dependency upon the departure.

It can be equally advantageous when, in the event of a lack of identity or in the event of a deviation beyond a predeterminable tolerance between the difference of the values denoting an engine torque and the difference of the clutch torques, the adaptation of the engagement point takes place incrementally or decrementally. It can also be of advantage if, in the event of an inequality between the difference of the engine torques and the difference of the clutch torques, the adaptation of the engagement point is carried out incrementally or decrementally.

In accordance with the inventive concept, it can be advantageous if the difference of the averaged values is used to ascertain a difference of the engine torque and the difference is compared with the difference of the values of clutch torque and, in the event of a lack of equality, at least one stored value of the engagement point is altered in accordance with the lack of equality.

It is advantageous if the measured values or parameters are ascertained for the purpose of determining a magnitude which denotes an engine torque or for the purpose of determining a difference of a parameter denoting an engine torque, on the basis of signals which characterize the actual load upon the engine, such as for example the engine torque, the engine RPM, a signal from the load lever, the position of the throttle valve, the time of ignition, the ignition angle, the negative pressure in the suction manifold and/or the timing of fuel injection.

Furthermore, it can be advantageous if the setting of the clutch torque by way of the control unit in at least one operating point is carried out, in accordance with the engagement point, to select a predeterminable desired clutch torque at a position or setting of the clutch or at a selected clutch torque in such a way that, in a first phase one determines the measured values of a magnitude denoting the engine torque, wherein such values can be averaged if desired or necessary, thereafter such values of the engine torque are compared with the set desired clutch torque and, in the event of a detected difference which is greater than a preselectable value, the value of the engagement point is incremented or decremented at least in a stepwise fashion and, thereafter, in the event of a detection of an incremented or decremented value of the engagement point, the procedure is repeated until the departure or deviation is less than the preselectable value.

It is of particular advantage when the length of the steps of stepwise incrementation or decrementation of the value of the engagements point exhibits a preselectable value or is dependent upon (such as a percentage of) the deviation.

It can also be advantageous if, when the clutch is disengaged and the transmissible torque is about to disappear, one ascertains the engine torque, thereafter the clutch torque, such as the transmissible clutch torque, is set to match the value of the engagement point plus a desired clutch torque and the engine torque is ascertained and, if the value of a preselectable difference between the engine torque and the clutch torque is exceeded, the value of the engagement point is increased stepwise and, after each increase, one ascertains the engine torque until the difference between the engine torque and the clutch torque is less than the preselectable value, and the then available value of the engagement point is stored.

In accordance with a further novel concept, it can be advantageous if the stepwise incrementing or decrementing of the value of the engagement point is carried out until the ascertained engine torque during two successive steps is once smaller and once larger than the selected clutch torque, and one of the last two values of the engagement point is stored.

It is of advantage if the stepwise incrementing or decrementing of the value of the engagement point is carried out until the engine torque which is ascertained during two successive steps is once smaller and once larger than the selected clutch torque, and at least the two last values of the engagement point are used to determine the physical value of the engagement point.

In accordance with a further inventive concept, it can be advantageous, too, if the physical value of the engagement point is ascertained by resorting to at least two values. such as the two last values, of the engagement point, for example, by resorting to an averaging procedure.

In accordance with an additional novel concept, it can also be advantageous if the physical value of the engagement point is ascertained by resorting to at least two values, such as the last two values, of the engagement point, for example, by resorting to linear regression.

In accordance with a further novel concept, it can also be of advantage if the physical value of the engagement point is ascertained on the basis of at least two values. such as the last two values, of the engagement point, by resorting for example to interpolation.

In accordance with a further inventive concept, it can also be of advantage if the value of the engagement point is ascertained by resorting to a linear or nonlinear regression, such as a quadratic or second degree, or other interpolation.

Still further, it is advantageous if "negative torques" are selected for the determination or adaptation of the engagement point. The expression "negative torques" denotes that, starting from the engagement point, the clutch is set to a position in a direction toward disengagement of the clutch.

It is of advantage if the determination or adaptation of the engagement point involves the selection of clutch positions which are located between a position corresponding to the fully disengaged clutch and the engagement point.

It is equally advantageous if, subsequent to the selection of a "negative torque," i.e., of a clutch condition between the fully disengaged position and the engagement point, there takes place a determination of a parameter which is representative of an engine torque and, when a change of the parameter denoting the engine torque relative to the setting of the position of the clutch takes place, the value of the engagement point is adapted.

It is also advisable if, when selecting a desired clutch torque as the sampling torque, the reaction of the engine torque is detected and, when the engine torque exceeds a preselectable threshold value, the clutch is disengaged and the sampling torque is reduced. Sampling torque is defined in such a way that one selects or sets a transmissible clutch torque in order to test (i.e., sample) the reaction of the engine. The value of magnitude of the clutch torque selected to test the reaction of the engine torque can be said to constitute a sampling torque or testing torque. In other words, one carries out a sampling or testing operation involving such an engagement of the clutch that a certain torque can be transmitted, and such clutch torque should provoke a reaction of the engine torque.

In accordance with a further inventive concept, it can be advantageous, in a method of regulating or controlling a motor vehicle of the type having a driving unit, a transmission, an automated torque transmitting system—such as a friction clutch—which may be in the path of torque transmission, but is not required to be in the path of torque transmission, and at least one control unit as well as at least one adjusting or actuating member which is controlled by the control unit and serves to select the torque capable of being transmitted by the torque transmitting unit, if at least one engagement point which is stored in at least one memory is caused to approximate a physically existing engagement point which characterizes the engaged condition of the torque transmitting system, e.g. clutch, when the transmission of torque begins, and the approximation involves an adjustment of the torque transmitting system which setting is a function of time and/or of the operating point.

Furthermore, it can be advantageous if the adaptation of the engagement point is carried out in accordance with a multiple-stage procedure in such a way that a first step involves a determination of measured values and the ascertainment of an averaged engine torque, a second step involves a setting of a clutch torque, a third step involves the determination of measured values and an ascertainment of an averaged engine torque, that the averaged values of the engine torques are compared with data pertaining to the clutch torques to carry out at least an approximation of the set of data denoting the engagement point to the physical engagement point and, a further step involves the setting of the originally existing clutch torque.

It can also be advantageous if the determination of measured values for the determination of engine torque is carried out on the basis of signals denoting the engine torque, the engine RPM, the load lever, the position of the throttle valve, the timing of fuel injection and/or the timing of fuel ignition.

It is advantageous, for the adaptation of the engagement point of a torque transmitting system in the power train of a motor vehicle with a control unit and an adjusting or actuating member for the torque transmitting system and with sensors for the determination of measured values if, at least in one operating point the setting of the clutch involves at least some of the following steps:

a) selection of a clutch position in which, basically, no torque is being transmitted, b) setting of a clutch position at which a desired clutch torque $M_{Ksoll}$ is to be transmitted, c) ascertaining measured values which represent the engine torque and which can be utilized to ascertain the engine torque, d) averaging of the measured values, e) establishing a difference between the values of torque and/or the measured values, f) a comparison of torque values and/or measured values and/or differences, g) incrementing/decrementing of the at least one stored value for the engagement point.

It can be of advantage if, at least in one operating point, the setting of the clutch for adaptation of the engagement point is carried out in at least four steps involving a step of setting the position of the clutch to a value at which a definite or predetermined torque $M_{K1}$ can be transmitted, a further step of determining the measured values $M_{Motor}$ within a time window $\Delta T_1$ at a constant or unchanging setting of the clutch, such measured values being thereupon averaged or calculated to $M_{M1}$ which denotes the engine torque, an additional step of selecting a clutch position at which a predetermined desired clutch torque $M_{K2}$ is to be transmittable, a further step of receiving the measured values $M_{Motor}$ within a time window $\Delta T_2$ at a fixed or unchanged position of the clutch and of thereupon averaging or calculating such measured values to result in $M_{M2}$ which denotes the engine torque, and an additional step of comparing essentially the difference $MM_2-M_{M1}$ of engine torques with the difference $M_{K2}-M_{K1}$ of the desired clutch torques, the stored value of the engagement point GP being incremented/decremented by a value $\Delta$GP when the comparing step indicates that $M_{M2}-M_{M1}$ is larger/smaller than $M_{K2}-M_{K1}$ and the difference eventually exceeds a preselectable threshold, which may be stored in memory.

It can be advantageous if at least one operating point for the adaptation of the engagement point is realized while the vehicle is at a standstill, the transmission is set into a gear ratio, and the brake is actuated.

It can also be advantageous if the time windows $\Delta T_1$ and $\Delta T_2$ are identical or of different durations, at least one measured value being ascertained per time window.

Furthermore, it can be advantageous if the duration of the time windows $\Delta T_1$ and $\Delta T_2$ is within the range of 0.1 to 10 seconds, it being preferred to select a duration of 1 to 5 seconds, most preferably 1 to 3 seconds.

It can be advantageous to adapt a long-lasting and a short-lasting engagement point.

It can also be advantageous if the long-range engagement point is adapted in the entire torque transmitting system on the basis of developing long-range changes.

Furthermore, it can be advantageous if the long-range engagement point is adapted in special operating points, such as for example in a snifting stage. A snifting stage is a phase during which a hydraulic system effects or is capable of effecting a volume equalization or compensation, for example, as a result of the opening of a valve.

It is also advantageous if the short-lasting engagement point on the basis of short-lasting reversible or irreversible changes is adapted within the entire system of the torque transmitting system.

It can be of advantage to design an embodiment of the invention in such a way that the value of the increment or decrement of long-range adaptation is less than or equals the value of the short-lasting adaptation.

BRIEF DESCRIPTION OF THE DRAWINGS

The invention will be explained in greater detail with reference to the drawings wherein:

FIG. 1 shows a motor vehicle 1, such as for example a passenger car or a truck, with a prime mover 2, such as an internal combustion engine or a motor. Furthermore, the power train of the motor vehicle contains a torque transmitting system 3 and a transmission 4. In this embodiment, the torque transmitting system 3 is disposed in the path of torque transmission between the prime mover 2 and the transmission 4 so that the torque furnished by the engine can be transmitted by way of the torque transmitting system 3 to the transmission 4 and from the output of the transmission 4 to a driven shaft 5 and/or to a driven axle 6 which is installed downstream thereof It is noted, however, that this invention also contemplates that the torque transmitting system 3 need not be disposed in the path of torque transmission between the prime mover and the transmission as when, for example, the torque transmitting system is installed downstream of an automated stepless transmission.

Figure 1:
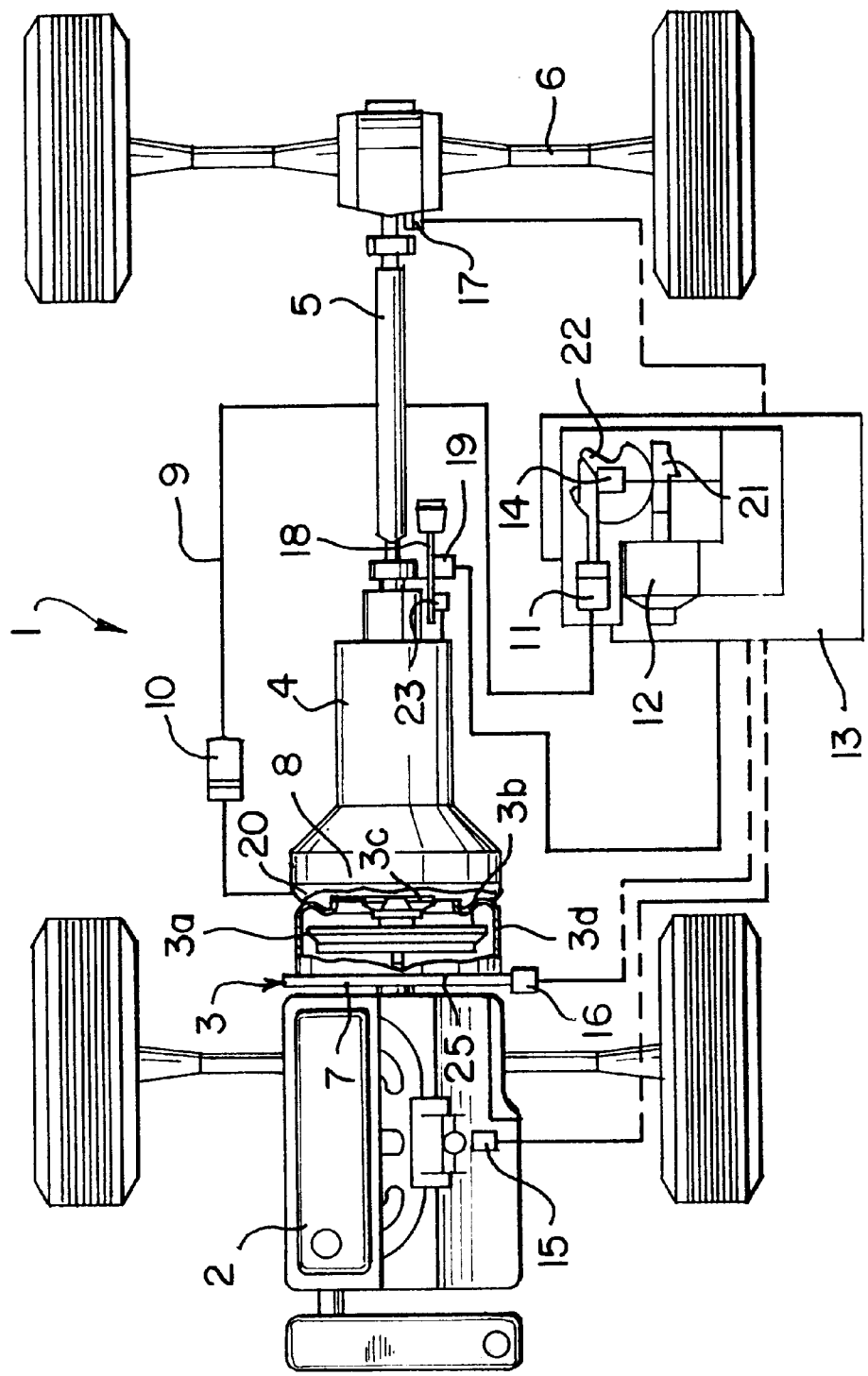
FIG. 1 is a schematic representation of a vehicle.

The torque transmitting system 3 constitutes a clutch, such as a friction clutch, and this clutch can constitute an automatically adjustable clutch which compensates for wear. The clutch 3 is mounted on a flywheel 25 or constitutes with the flywheel a module, and this clutch comprises essentially a clutch cover or housing 3d, a diaphragm spring 3b, a pressure plate 3a and a clutch disc 3e. In this embodiment, the clutch is actuated by a disengaging bearing 3c and a disengaging fork 20 by way of a hydraulic system.

In order to select a torque which can be transmitted by the torque transmitting system 3, it is also possible to employ hydraulic clutch disengaging means or to resort to a purely electromechanical or electromagnetic solution. Such arrangements for setting a clutch are known, for example, from the field of magnetic powder or magnetic particle clutches.

The illustrated transmission 4 is a manual transmission; however, this transmission can be replaced with an automated or automatic transmission such as a multirange transmission or an infinitely variable transmission such as a transmission (known as CVT) which employs belts and conical torque transmitting components. For example, an automated transmission can comprise a shifting roller which can select the gear ratios. It is also possible to employ a manual transmission with a gear ratio selector in the form of an actor which initiates and carries out a gear ratio selection and gear ratio shifting operation. The transmission can be designed in such a way that shifting into a gear ratio can take place with or without an interruption of traction.

It is also possible to equip or associate an automatic transmission with a torque transmitting system, such as a clutch and/or friction clutch, which is installed at the output side of the transmission. Furthermore, the torque transmitting system can constitute a starter clutch or a torque converter with a lockup or bypass clutch and/or a safety clutch and/or a reversing wheel set gearing with planned selection of the transmissible torque. The torque transmitting system 3 comprises an input side 7 and an output side 8, a selected torque being transmitted from the input side 7 to the output side 8.

The torque transmitting system 3 is controlled by a control unit or apparatus 13 which can comprise an actor and regulating electronics. The actor can consist of a prime mover 12, such as an electric motor, which acts upon a master cylinder 11 by way of a transmission 21, such as a bevel gearing, and a pusher or piston rod 22. The movement of the pusher 22 (i.e., of the piston of the master cylinder) is detected by a distance monitoring sensor 14. For example, the distance monitoring sensor 14, such as a clutch movement sensor, can constitute a potentiometer or an inductive sensor or a Hall Generator sensor or an optical sensor. The master cylinder 11 is connected with a slave cylinder 10 by way of a motion transmitting device, such as a hydraulic conduit 9. The slave cylinder 10 can be operatively connected with the clutch disengaging means 20 in such a way that a movement of the output part of the slave cylinder actuates the disengaging means 20 in order to control, in a planned manner, the torque which can be transmitted by the clutch 3. Furthermore, the slave cylinder 10 can be designed to constitute a central clutch disengaging member which can directly or indirectly initiate an adjustment or setting of the torque transmitting system 3. The disengaging means 20, which is actuated by the output part of the slave cylinder 10, can carry the disengaging bearing 3c which can serve for example, as a means for directly actuating or adjusting the friction clutch 3.

In a torque transmitting system, such as a friction clutch the selection of the torque which can be transmitted is effected by exerting a controlled pressure upon the clutch disc between the flywheel 25 and the pressure plate 3a. For example, the position of the disengaging means 20 can determine the force with which the pressure plate 3a is caused to bear upon the friction linings of the clutch disc 3e in a planned manner; the pressure plate 3a can be caused to move between two end positions and can be fixed in any selected position between the two end positions.

One end position corresponds to a fully engaged condition of the clutch 3 in which the clutch is capable of transmitting a maximal torque, and the other end position corresponds to the fully disengaged condition of the clutch in which the magnitude of the transmissible torque is zero. The engagement point is located between such end positions; namely it corresponds to an intermediate position of the pressure plate 3a in which the clutch 3 begins to transmit torque.

If the engagement point is considered as a position or condition of engagement of the clutch in which position or condition the clutch transmits a predetermine torque (such as 0 Nm or 9 Nm or another torque), the engagement point can be said to be fixed. However, thermal stressing and/or the wear upon the friction linings of the clutch disc in a friction clutch and/or other reversible or irreversible phenomena or developments can change the position or condition of engagement, i.e., such phenomenon or phenomena can entail a change of the position of the engagement point GP. For example, if the hydraulic path (conduit 9 in FIG. 1) between the master cylinder 11 and the slave cylinder 10 is heated (i.e., if the temperature of the hydraulic fluid in the conduit 9 rises), that value of the engagement point GP which is stored in the memory of the control unit 13 can deviate from the actual or real or physically present value of the engagement point. The engagement point GP of the torque transmitting system (such as the clutch 3) can be adapted (i.e., caused to conform to changed circumstances) in at least one operating point of the vehicle.

It is possible to ascertain the engagement point on the basis, for example, of a direct local measurement in the clutch or, for example by measuring that force with which the clutch is held in the engaged condition, as a function of the distance covered by the clutch actuating (adjusting) means. Alternatively, one measures the engine torque in dependency on the condition of engagement (position) of the clutch, and a reaction of the engine torque to actuation of the clutch can be considered as an indication of the momentary setting (extent of engagement) of the clutch and the engagement point.

In order to select a transmissible torque, for example a torque which is less than the momentarily prevailing engine torque. one can for example select a position of the pressure plate 3a which is disposed somewhere between the two end positions. However, it is also possible to select transmissible clutch torques which exceed the then existing engine torque by a defined or preselected value.

As a rule, a torque transmitting system—such as a friction clutch—is normally designed in such a way that the maximum transmissible torque exceeds the nominal engine torque by a certain factor, especially a factor greater than 1.5. Thus, when the clutch is fully engaged, there exists or is prevalent an application of excessive pressure because, under most circumstances of operation, the input of the torque transmitting system does not receive the nominal engine torque. By resorting to a torque follow-up, i.e., to a planned selection of the torque which can be transmitted by the torque transmitting system, the transmissible torque can be caused to conform to the existing engine torque, and it is possible to select—in a planned manner—a slight overpressure or a slight underpressure, i.e., the torque which can be transmitted by the torque transmitting system is slightly larger or slightly smaller than the existing engine torque.

Among others, the aforediscussed follow-up of transmissible torque exhibits the advantage that, basically, the clutch is engaged only to an extent as dictated by the momentarily prevailing engine torque and, therefore, a reaction involving a more pronounced disengagement or engagement of the clutch can be carried out within a shorter interval of time. A torque follow-up with a slight overpressure permits the transmission of the momentarily prevailing engine torque and ensures a damping of those fluctuations of torque which exceed the torque adapted to be transmitted by the torque transmitting system because the torque transmitting system begins to slip in response to the development of such irregularities of torque.

The torque which can be transmitted by the torque transmitting system, such as a clutch, is controlled or regulated by the control unit 13. The term "controlling" is intended to denote herein a procedure without feedback in an open loop. As used herein, the term "regulation" is intended to denote a procedure with feedback in a closed loop. In the case of a feedback, this involves a feedback of a signal denoting an actual value, and one ascertains the difference between the desired and actual values; if possible, the regulator reduces such difference to zero.

In order to effect a controlling or a regulation of the torque transmitting system, one employs signals which basically denote or characterize the operating condition of the motor vehicle 1 and which are a function of the prevailing characteristic values of the system. The sensors, which detect and indicate the operational parameters and furnish corresponding signals, transmit such signals to the control unit or electronic unit 13. This control unit or electronic unit can be connected with further electronic units, such as for example an electronic unit of an ABS (automatic braking system) system, an electronic engine management, an antislip regulation or a transmission control.

A predetermined position or condition of engagement can be furnished, for example, by a characteristic field or a characteristic curve or by fixed positions which are stored in the control unit 13. Such preselection or predetermination is carried out by the programmer of the software for the control unit, and the storing of such programmed information entails a fixing of the information. However, it is also possible to utilize preselectable values in the form of functions or parameters of the motor vehicle, i.e., they might by variable.

By way of example, the embodiment of FIG. 1 shows a throttle valve sensor 15, an engine RPM sensor 16 and a tachometer sensor 17; all of these transmit signals denoting measured values, i.e., data, to the control unit 13. Furthermore, the transmission 4 is provided with an actuating lever 18 which is or which can be provided or connected, for example, with a sensor or sensor system 19 for recognition and/or detection of the selected transmission gear ratio. Furthermore, there can be provided in the region of the transmission 4 a sensor or sensor system 23 for the recognition of the actual or momentarily effective transmission gear ratio and/or of the intention to shift into a particular gear ratio. The control unit 13 comprises the gearing 21, the push rod 22 and the master cylinder 11 as well as the position monitoring sensor 14 which directly or indirectly detects the position of the piston of the master cylinder 11. The torque which can be transmitted by, for example, the setting of the torque transmitting system 3 can be ascertained or calculated on the basis of the position of the piston of the master cylinder 11, namely on the basis of the physical characteristics and/or characteristic values of the connection including the parts 9, 10, 20. It is possible to provide a clutch condition detecting sensor directly on or to couple such sensor with the actuating means or, for example, on or with the pressure plate 3a.

The control apparatus or control unit 13 is at least temporarily in a signal receiving connection with the sensors or other attached electronic units, and transmits signals to the prime mover 12 (such as an electric motor)—for the purposes of setting the clutch, i.e., of selecting the transmissible torque in dependency upon the measured values and/or the system input values and/or the signals of the associated sensors and/or the implemented control or regulating procedure. To this end, a control program is implemented in the control unit 13 in either hardware and/or software. In the case of a driving torque which is being applied at an operating point and which has been ascertained or calculated on the basis of system input values, the control unit selects or calculates for the clutch-actuating member a setting position and the electric motor 12 receives and is actuated in response to reception of a signal denoting a clutch setting value. The operative connection between the master cylinder 11 and the slave cylinder 10, such as the hydraulic conduit 9, causes a displacement of the piston in the master cylinder 11 that entails the transmission of a movement to the adjusting or actuating, means 20, which may be in the form of disengaging fork 20, so that the clutch is set in accordance with the characteristics, intensity or amplitude of the signal from the control unit 13.

In the embodiment which is shown in FIG. 1 and which employs a master cylinder 11 and a slave cylinder 10, there is provided a fluid-operated approach which employs the hydraulic conduit 9, however, it is also possible to utilize embodiments which operate in a different manner. Such alternate solutions can rely, for example, on a purely mechanical mode of actuating the clutch, e.g., by way of a linkage or a Bowden wire.

In order to select and to optimize the desired transmissible torque, it is necessary to possess a detailed and accurate knowledge of the entire system. For example, such knowledge of, or familiarity with, the system can be arrived at in a relatively satisfactory manner if the operating point of the torque transmitting system is known or ascertainable with a relatively high degree of accuracy or can be caused to follow rather well or be adequately adapted to the actual circumstances.

A method for the adaptation of the engagement point can provide a detection of the physically existing engagement point, and such value of the engagement point is stored in a memory. The software of the control method utilizes such value for the purposes of regulating the operation of the clutch 3.

A further method of adapting the engagement point can provide that one detects the physically existing engagement point, and such value is compared with the momentarily stored value of the engagement point, whereupon the stored value of the engagement point is altered incrementally or decrementally on the basis of such comparison.

The aforedescribed second method exhibits the advantage that, in the event of inaccurate or erroneous measurement of the engagement point and the following adaptive step, the stored engagement point does not deviate appreciably from the physical engagement point. For example, such erroneous or inaccurate measurements can develop in response to connection or disconnection of auxiliary devices when such connection or disconnection takes place within the time interval of detection of the physically existing engagement point or an adaptation of the engagement point. In this manner, the ascertained torque at the engagement point can depart to a considerable extent from the actual torque at the engagement point. The turning on or the turning off of an air conditioning system can cause an error at the engagement point in the range of 5 to 100 Nm. The auxiliary pump of the power steering system can also cause distortions in the range of 10 Nm.

In the event of wear, in the case of tolerances and other departures or changes, such as for example thermally induced influences in the entire region affecting or encompassing the torque transmitting system, including the signal transmitting path and the adjusting or actuating member, there can take place a change of the actually transmissible torque or a change of the engagement point in comparison with the stored value, and hence a change of the selected transmissible desired clutch torque or engagement point so that the sets of data in the at least one memory are not indicative of the conditions prevailing in each operating point. For example, a temperature rise in the space under the hood, i.e. engine space, can lead to a heating of the signal transmitting path (9, 10, 11) and to a shifting of the physical position of the engagement point which entails a difference between the stored value and the actual value of the engagement point. If a setting or adjustment of the torque transmitting system is to take place under such circumstances, the selected transmissible torque departs considerably from the desired or required value.

For example, if the torque transmitting system is set or adjusted in such a way that a small torque is to entail a creeping movement of the vehicle, there can develop an excessive creeping, or no creeping at all will take place, depending upon the shifting of the engagement point in the one or the other direction.

The regulation of a creeping start of a vehicle is a highly sensitive procedure when the engagement point is shifted in an electronically controlled clutch because the creeping torque which is required to achieve a creeping movement is relatively small. The values of the creeping torque are in the range between a few Nm and a times 10 Nm wherein a is a number between one and ten.

At the start of a creeping operation, the clutch of the motor vehicle is engaged up to a desired torque so that the vehicle is set in motion, slowly and gradually, while the load lever is held in the idling position and the gas pedal is not depressed. However, if the actual characteristic curve of the clutch departs from the characteristic curve which is programmed into the controls and/or from the stored data, the clutch is engaged to an insufficient extent or to an excessive extent. Consequently, the vehicle will creep at an insufficient rate or at an excessive rate. If the clutch is engaged to an excessive extent, there exists the danger that the engine will be choked whereas; if the engagement of the clutch is insufficient, the creeping is not likely to occur, i.e., the vehicle will be started or set in motion only in response to an actuation of the load lever.

The preceding explanations indicate that a so-called shifting of the engagement point entails a shifting of the actual characteristic curve of the clutch relative to the normal characteristic curve. The characteristic curve which is stored in the software and is actually utilized follows the initial progress. An adaptation of the engagement point denotes a procedure involving a conformance or approximation of the engagement point, which is stored in the software and is actually utilized, to the physically prevailing or existing engagement point. It is particularly advantageous to resort to an adaptation of the engagement point which involves a parameter, signal or structural adaptation, a parameter adaptation being preferred at this time.

It should be possible to carry out a detection of the engagement point taking into account engine parameters such as for example, shifting of the transmission into a gear ratio, the actuation of a brake, the engine RPM, the speed of the motor vehicle, the RPM of the transmission, a non-existing change of the prevailing engine torque (e.g. due to the turning on or off of an air conditioning system), the non-existence of an intention to shift the transmission into a different gear ratio, the absence of actuation of the gas pedal and possibly other vehicle parameters. However, the presence of certain parameters can also denote that the determination of the engagement point should be interrupted or prevented, for example, when the operator of the vehicle intends to shift the transmission into a different gear ratio which should result in planned (e.g., automatic) disengagement (opening) of the clutch and the control unit 13 should not initiate a determination of the engagement point of the clutch.

Figure 2:
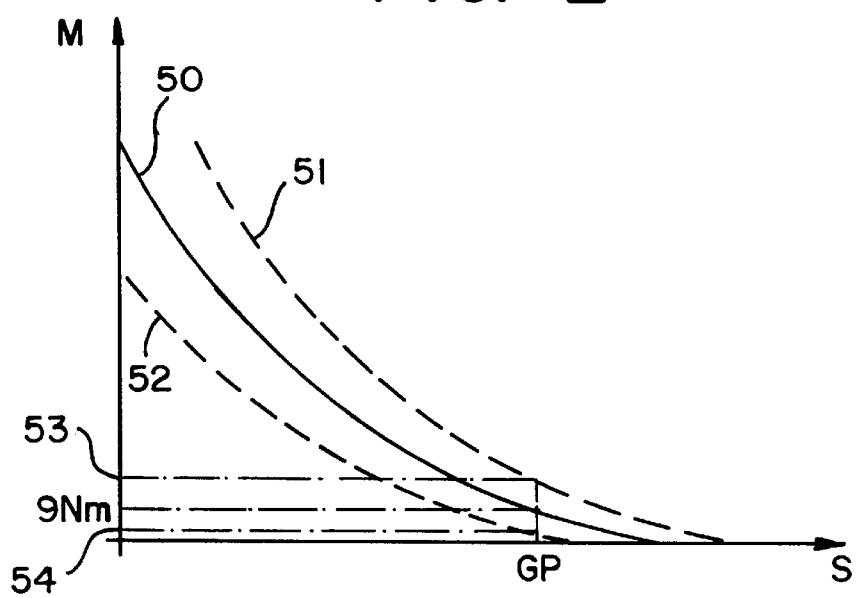
FIG. 2 is a characteristic curve of torque as a function of disengagement distance S.

FIG. 2 shows a curve 50 representing the characteristic curve of the clutch and shows torque M measured along the ordinate and the disengagement distance s of the clutch measured along the abscissa, it being assumed here that the clutch is of the type shown in FIG. 1 wherein the actuation is carried out by hydraulic means, such as by the cylinders 10, 11 and conduit 9.

In the event of a cooling of the hydraulic fluid in the hydraulic system (9, 10, 11) which is used to adjust the clutch, the characteristic curve of the clutch is shifted from the curve 50 to the curve 51, whereas such curve is shifted from 50 to 52 in the event of a rise of the temperature of hydraulic fluid. In the event of a cooling or a heating of the hydraulic fluid, the torque $M_{K11}$ which is to be selected follows a different path, i.e., the position of disengagement of the clutch is changed so that, when one selects a predetermined value of clutch torque, it is necessary to select a different distances, i.e., a changed setting of the clutch in the event of a change of the circumstances, such as a change in the temperature of the hydraulic fluid.

If one takes into consideration a fixedly selected and set clutch positions such as can be designated for example as GP, this means that such value corresponds (in the event of a normal characteristic curve of the clutch as denoted at 50) to a desired torque of 9 Nm as measured along the ordinate of the coordinate diagram shown in FIG. 2. It will be seen that, if the hydraulic fluid is cooled, the selected or set clutch torque is twice as large, as shown by point 53 in the diagram of FIG. 2. If the temperature of the fluid rises, the selected clutch torque is very small and is nearly zero, as shown by point 54 in the diagram of FIG. 2.

As can be seen in the example of FIG. 2, a change of the characteristic curve of the clutch in comparison with the stored original data denoting the characteristic curve of the clutch entails a false setting of the transmissible torque when the distance being covered is the same. Though the description of FIG. 2 was made in connection with distortions resulting from temperature changes of the hydraulic fluid, analogous situations will arise for example in the event of wear or other processes or developments which affect or alter the system.

It is to be taken into consideration, in connection with the events which effect a change of the torque transmitting system, that one must distinguish between reversible and irreversible events. A wear upon the friction linings or upon other component parts is an irreversible process. On the other hand, for example, thermally induced changes of the torque transmitting system are reversible events which can arise repeatedly under a number of circumstances such as, for example, after stoppage of the vehicle or during renewed starting as well as in response to changes of load upon the motor vehicle. Such events can vary as a function of time.

Figure 3:
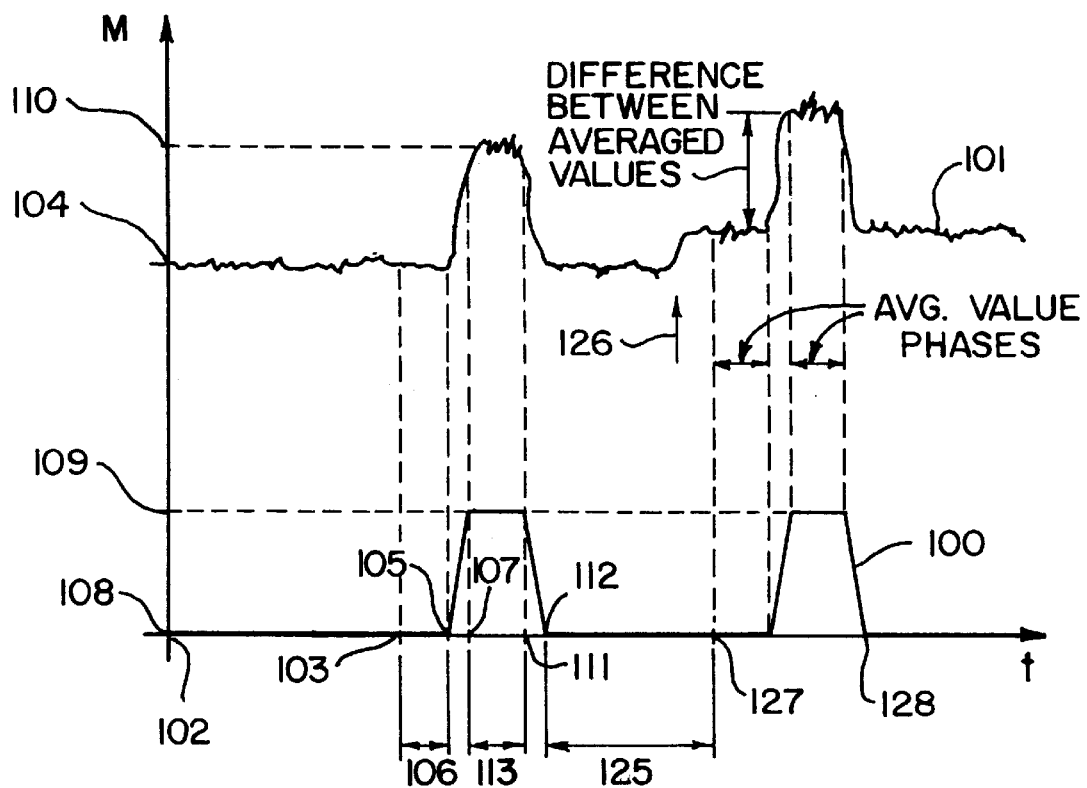
FIG. 3 is a series of curves of torque as a function of time.

FIG. 3 shows curves denoting the values of torque M as a function of time t, i.e., the time t is measured along the abscissa and the torque M is measured along the ordinate. Curve 100 denotes the clutch torque, and curve 101 denotes the engine torque. The signal denoting the engine torque 101 is ascertained either directly or on the basis of signals which are proportional to the engine torque or represent the engine torque, such as for example the engine RPM, the position of the throttle valve, the subatmospheric pressure in the suction manifold, and/or the ignition time or the position of the load lever. It is also possible to rely on a combination of such parameters for the purpose of establishing the engine torque. At the start of the illustrated time interval in the region between the instants 102 and 103, the clutch torque is basically constant and has a low value 108, for example zero. Also, the engine torque is essentially constant, however, inaccuracies of measurement as well as time-dependent variations due to the regulation of idling cause a certain fluctuation or straying of the value denoted by the curve 101. The magnitude of the engine torque within this time interval (between the instants 102 and 103) is shown at 104.

In the time interval between the instants 103 and 105 (interval 106), one ascertains or receives measured values and, upon the expiration of this interval, the measured values are averaged so that an averaged measured value $M_{M1}$ is available for the time interval 106; such averaged value is capable of being stored and denotes the engine torque within this interval (106) of time. During the time interval between the instants 105 and 107, the clutch torque rises from a value 108 to a value 109, and the value of the engine torque also increases during such interval, namely from the value 104 to a value 110. The increase of the engine torque results from the condition of equilibrium during idling because the idling regulator increases the engine torque when the load upon the engine is increased. Thus, the basic premise is the static equilibrium torques at the engine, such as normally also develops as a result of the regulation of idling in conventional engines. Thus, an increase of the clutch torque when the vehicle is at a standstill will entail a substantially equivalent increase of the engine torque. In view of the above, the stored value of the engagement point is then considered as having been properly selected or set or stored when a status of equilibrium is realized at the engine, i.e., when (it being assumed that the engagement point has been properly ascertained) the engine torque increases by a value which matches or approximates the increase of the clutch torque. During the interval between the instants 107 and 111 (interval 113), the engine torque or the signals representing the engine torque—will be detected again and the thus obtained signals are thereupon averaged. Within the interval between the instants 111 and 112, the clutch torque descends or drops from the value 109 back to the value 108. The engine torque also decreases accordingly, back to the value 104.

In order to adapt the engagement point, the averaged value denoting the engine torque within the time interval 106 is compared with the averaged value during the time interval 113 in such a way that one establishes, for example, a difference and one ascertains that absolute value which is indicative of the increase of the averaged engine torque. The extent of the increase of the clutch torque is also known at such time. The difference between the clutch torque 109 within the time interval 1 13 and the clutch torque 108 within the time interval 106 furnishes the desired or required value by which the averaged engine torque should have risen within the corresponding time intervals in order to ensure that the stored value of the engagement point is correct or that a correct value of the engagement point has been stored. In the event of an equilibrium of engine torques during idling, a minor increase of the clutch torque entails an equal rise of the engine torque. If a difference exists between the differences of engine torques and the differences of clutch torque, the value of the engagement point was improperly selected and stored prior to the cycle or, alternatively, the system including (a) the signal transmitting path, (b) the clutch, and (c) the power train, has changed during the interval following the last adaptation step.

Owing to such change, for example of the signal transmitting means (9, 10, 11) or of the torque transmitting system (3), the difference of the averaged engine torques departs from the difference of the clutch torques. As a result of such departure or deviation, the stored value GP of the engagement point, as indicated in FIG. 2, is changed to a small extent in order to come closer to or to match the values of the actual engagement point. Depending upon whether the divergence between the difference of the averaged values of the engine torque and the differences of the values of clutch torque is positive or negative, i.e., depending upon the direction of shifting of the physical engagement point (see FIG. 2), the stored engagement point GP is incrementally increased or decrementally reduced by a value ΔGP. The amount of the increment ΔGP can depend upon the difference between the values of engine torque and of clutch torque. However, it is also possible to select a fixed or unchanging value of ΔGP.

Adaptation of the engagement point is preferably carried out under certain conditions of operation namely when it is not noticed or felt or is noticed or felt only slightly by the passengers) and the operator of the vehicle. One such operating point or range of operation is the standstill of the vehicle while the prime mover, e.g. engine is running, while the transmission is shifted into a gear ratio, and while the brake (be it a manually operated brake, a foot-operated brake or a so-called fixing brake) is actuated. Further possible operating conditions are those at which a minor change of the transmissible clutch torque does not entail a change of the condition of the vehicle so that the adaptation procedure can be carried out in such a way that it is not noticed by the operator, however, it is equally possible to carry out the ascertainment of the operating point under other circumstances of operation.

In order to carry out an adaptation, it is first determined whether or not there exists an operational condition which permits an adaptation of the engagement point or of the characteristic curve of the clutch. If such an inquiry results in a positive answer, an adaptation of the engagement point is carried out, for example, in accordance with the procedure as illustrated in FIG. 3. The carrying out of the adaptation necessitates a window in the range of seconds, namely that an adaptation can be meaningfully carried out within a time window of one second to approximately 20 seconds. Basically, one prefers to resort to adaptation procedures which involve resort to time windows within the range of a second to ascertain the measured values and to complete the averaging of the thus ascertained values. The intervals oftime windows for the determination and averaging of measured values depends upon the clock frequency of the control unit for the determination of data and upon the quality of the signal which is to be ascertained. The time windows for the determination of data in the embodiment of FIG. 3 are set up for intervals of two seconds each. The duration of repetition, or the interval between the adaptation procedures, can be variable, an immediate succession of adaptation procedures (without intervals between them) is generally not advisable. It has been found to be of advantage that a certain interval of time elapses between successive adaptation procedures; such interval is required in a majority of motor vehicles to again stabilize the idling behavior of the engine. The starting of a subsequent adaptation step is preferably carried out only when the power train including the engine is again in a state of equilibrium.

As already described above, FIG. 3 shows an adjustment of the torque transmitting system, such as a clutch, within the time interval starting at the instant 102 and terminating at the instant 112. for the purpose of ascertainment or adaptation. After the instant 112. there follows an interval 125 during which no adaptation is being carried out. During the interval 125, there develops a rise of the engine torque, and this is indicated by the arrow 126. Such basically abrupt or sudden rise of the torque can be caused by an auxiliary device or consumer which was turned on or off at the instant 127. Such auxiliary consumer can constitute, for example, a dynamo or light generator, an air conditioning system, an auxiliary pump of the power steering unit and/or other aggregate(s) such as, for example, one or more compressors which can be turned on and off.

During the interval between the instants 127 and 128, the adaptation strategy is carried out in a manner as described hereinbefore, and the progress of the adaptation can correspond to that during the interval between the instants 103 and 112.

Due to the establishment of differences and averaging of the data, the aforedescribed spontaneous one-time event or changes of the engine torque which arise or develop during the intervals including 126 exert no influence at all or their influence is insignificant. If an abrupt change of torque develops outside of the time window for adaptation, the determination or adaptation of the engagement point is not distorted.

If a change of the engine torque takes place during the adaptation phase, the averaging of data ensures that the undesirable influence is at least weakened.

The averaging of sets of data which are obtained during the respective measurement periods is of advantage for the quality of the data because, as a rule, it is advisable to take into consideration fluctuations of the measured data within a given time window.

The adaptation of the engagement point is preferably effected in such a manner that upon completion of a determination of the difference between the averaged values of the engine torque and the selected clutch torque within at least two intervals of time, one ascertains or calculates whether the engine torque(s) is (or are) larger or smaller than the value(s) of the clutch torque. In the event that the value(s) of the engine torque is (or are) greater than the value(s) of the clutch torque(s), the engagement point GP which has been stored in the software is increased by one increment. If the opposite is the case, i.e., that the difference of averaged values of the engine torque is less than the difference of the clutch torques, an equilibrium of engine torques—at least during idling—brings about that the actually effective clutch torque is smaller than the preselected value of the desired clutch torque, then the engagement point is decremented under the just outlined circumstances.

If the operating condition is such that an adaptation is acceptable, the adaptation is carried out at least as a function of time. An incrementing or decrementing of the engagement point by a value $\Delta GP$ ensures that the engagement point is not altered by a substantial value in a single step.

If there arises or develops a distortion of the engine torque, for example because the equilibrium was disturbed for a short interval of time or on short notice by an auxiliary consumer, there would develop, in the absence of stepwise incrementation or decrementation, an excessive change of the engagement point.

The alteration of the engagement point takes place incrementally or decrementally, i.e., the clutch torque which is set during the next-following cycle does not have a value GP (see 109 in FIG. 3) but rather a value GP±$\Delta GP$. The positive or negative sign of $\Delta GP$ depends upon whether in the course of the last comparison the difference of the engine torques was larger or smaller than the difference between the clutch torques.

Furthermore, it can be of advantage if, for the purposes of adaptation of the engagement point, one carries out a plurality of measuring cycles and the engagement point is adapted or calculated or approximated on the basis of calculated or ascertained measured values obtained during a plurality of cycles.

In order to adapt an engagement point, it can be of advantage to resort to a procedure with a dynamic-$\Delta GP$ in contrast to an incremental or decremental adaptation with fixed adaptation steps $\Delta GP$. The value of $\Delta GP$ can depend upon the calculated physical engagement point, as well as upon the desired clutch torque and can be determined, for example, by utilizing a functional relationship or can be stored in the form of a characteristic field. The value of $\Delta GP$ can depend linearly upon the deviation between the desired and actual values of the engagement point.

Figure 4:
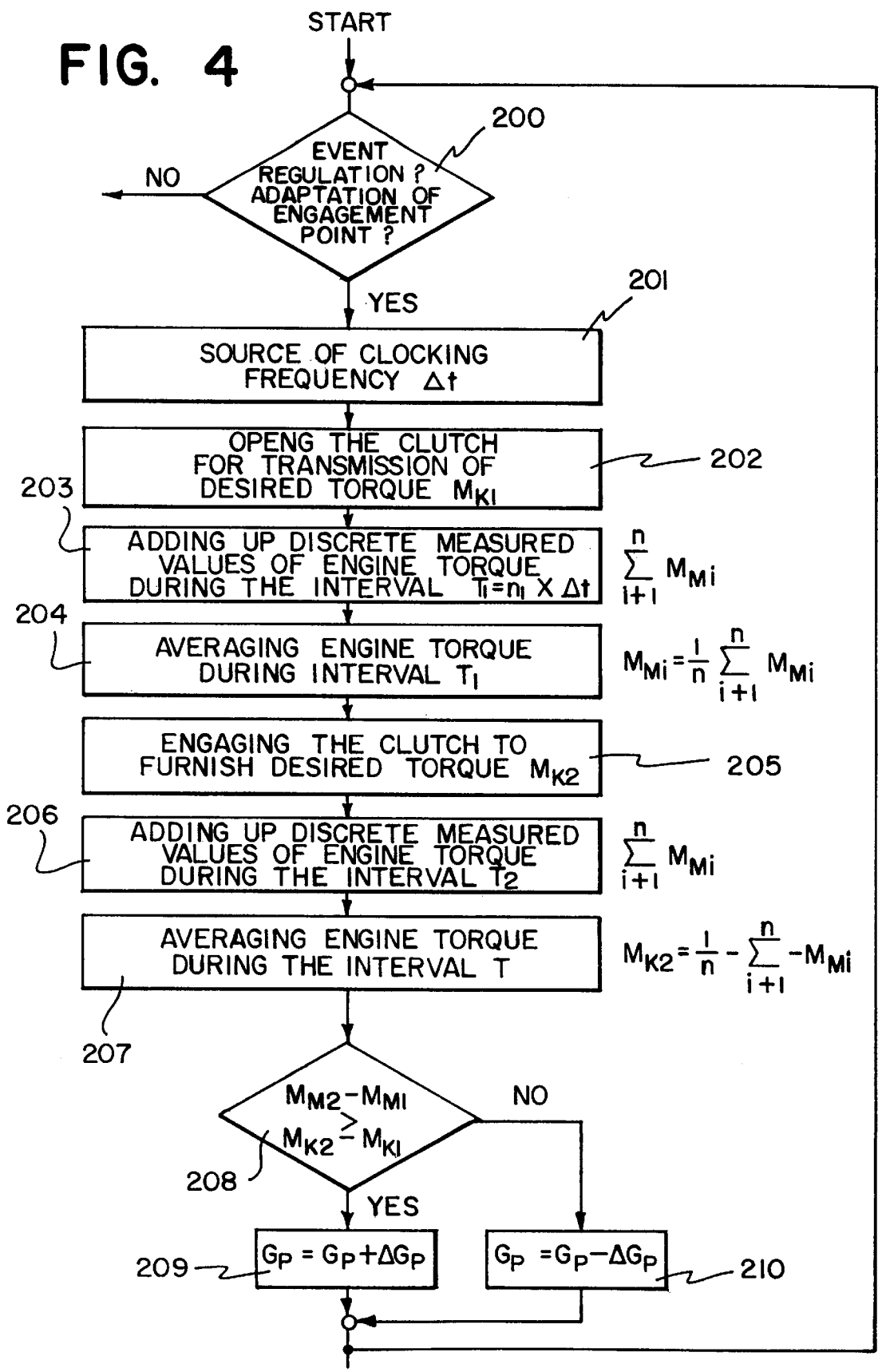
FIG. 4 is a flow chart of torque measurement and engagement point determination.

FIG. 4 is a flow chart which can represent, for example, the progress or flow of an adaptation procedure. Proceeding from decisional step 200, the adaptation of the engagement point is initiated or prevented in dependency upon the occurrence of certain events or as a function of time. At step 200, the control system determines operating condition on the basis of system parameters and decides whether or not there exists an operating condition in which the adaptation of the engagement point can be carried out or will be carried out, or whether the operating condition is such that an adaptation of the engagement point will not take place.

If at step 200, the event sensing and signal processing control system determines that there exists an operating condition which permits an adaptation of the engagement point, the adaptation of the engagement point is carried out in such operating condition as a function of time, namely the adaptation of the engagement point preferably does not take place continuously but rather by resorting to time windows within which an adaptation is carried out.

If at step 200, the control system determines that an adaptation is to be carried out, step 201 furnishes the interval ($\Delta t$) during which the measured values of the engine torque or the measured values of parameters which are proportional to the engine torque or at least basically denote the engine torque are being received by the control unit 13.

At step 202, the torque transmitting system 3—such as a friction clutch—is set for a desired torque value $M_K=M_{K1}$, i.e., at this value the clutch can be disengaged, engaged or remain unchanged, depending upon which desired value of clutch torque $M_K$ was set prior to such time.

At step 203, $M_{Mi}$ signals are received which denote discrete measured values, namely values which are at least representative of the engine torque. The measured values are added during the time interval $T_1=n_1\times\Delta t$ wherein $T_1$ and $n_1$ determine the entire interval of reception of measured values and $n_1$ basically denotes the number of the ascertained measured values or the number of ascertained measured values plus one, and $\Delta t$ denotes the clocking frequency of the reception of measured values. Furthermore, the measured values $M_{Mi}$ obtained within the time interval $T_1$ are totalized.

At step 204, the control unit forms an average value of the engine torque and this value is averaged by the number of the received measured values.

At step 205, the clutch is set for a desired torque $M_{K2}$, i.e., $M_K=M_{K2}$. It would be expected that the value of $M_{K2}$ would depart from that of $M_{K1}$. At step 206, again the same as with step 203, measured values $M_{Mi}$ within the time interval $T_2$ which is $n_2\times\Delta t$ are summed. At step 207, the average value of the engine torque within the time interval $T_2$ is calculated, such averaging involving the ascertainment of the median value of the measured values which were obtained within the time interval $T_2$.

At the end of step 207, the clutch is again set to a value which is the same as prior to the start of the adaptation. However, this procedure can be dispensed with, i.e., the clutch torque can remain at the value $M_{K2}$.

At step 208, one obtains the difference $M_{M2}-M_{M1}$ of the averaged engine torques and, at the same time, there is ascertained the difference $M_{K2}-M_{K1}$ between the selected clutch torques. Subsequent to the establishment of such differences, there is carried out a comparison to ascertain whether the difference between the engine torques is larger or smaller than the difference between the clutch torques and, in dependency thereon, a decision is made as to how to change or adapt the engagement point which was selected by the software. If the difference between the engine torques is larger than the difference between the clutch torques, the system proceeds to step 209 which involves an increase of the engagement point GP by the value $\Delta GP$. Alternatively, i.e., when the difference between the engine torques is smaller than or equals the difference between the clutch torques, the system proceeds to step 210 which involves a decrementing of the engagement point GP by the value $\Delta GP$.

The incrementing/decrementing of the value of the engagement point can also be carried out only when the discrepancy or departure of the engine torque difference ($M_{M2}-M_{M1}$), from the clutch torque difference ($M_{K2}-M_{K1}$) exceeds a predeterminable tolerance range.

If the departure is within the tolerance range, an adaptation or an alteration of the stored value of the adaptation point can be dispensed with. If the departure is outside of the tolerance range, the value of the engagement point is incremented or decremented.

The adaptation is completed in the next step, and the event controls or timing controls denoted by step 200 decide whether or not a further adaptation procedure or adaptation step is to be initiated.

An adaptation of that value of the engagement point which is utilized by the control unit takes place in several steps (stages). For example, when the vehicle is at a standstill, the clutch is engaged, the brake is actuated and the gas pedal is not depressed (i.e., when the engine is idling and the clutch is at least substantially disengaged), the first step of adapting the engagement point involves a determination of the engine torque. The next step involves such actuation of the clutch that the clutch is set to transmit a transmittable desired clutch torque, for example, 10 Nm. Thus, the position or condition of the clutch is set by resortingi to a characteristic curve which is stored in the control unit so that the clutch is ready to transmit a desired torque. Once the setting of the clutch to transmit a desired torque (such as for example 10 Nm) is completed, the engine torque is ascertained again in a further step or during a subsequent measuring interval. The subsequent step involves a comparison of the engine torque, which was ascertained while the clutch was disengaged, with the engine torque which was ascertained while the clutch was set to transmit a predetermined torque, or one establishes a difference between the two values of engine torque and the signal denoting such difference is or can be processed. If the increase of the engine torque in comparison to the increase of the clutch torque (namely from practically zero when the clutch is disengaged to a preselectable value which is furnished by the control unit 13) is smaller, the value of the engagement point which is utilized (stored) by the control unit is shifted or changed relative to the physically existing or available engagement point. Thus, the determination of the engagement point takes place in several stages or steps, and certain steps can involve the detection or the measurement (monitoring) of the engine torque, whereas the other steps involve engagement of the clutch to a value which is determined by the control unit. It is also possible to engage (close) the clutch in a stepwise fashion, and the clutch closing steps can alternate, for example, with detections of the engine torque.

The determination as to whether the difference of the engine torques is larger or smaller than the difference of the clutch torques is based on the premise that, due to the fluctuation of the measured values denoting the engine torque and of the ensuing averaging of such measured values, it is not always possible to achieve an identity between the values denoting the engine torque and the values denoting the clutch torque, i.e., it is not absolutely necessary to ascertain whether or not an equality or identity actually exists and the ensuing not-carried out or skipped modification of the adaptation of the engagement point can be dispensed with under certain circumstances.

It can be of advantage if negative clutch torques are also determined in connection with the adaptation of the engagement point. Such negative clutch torques are ascertained in such a way that one selects a clutch position and the corresponding clutch torque which is set by actuating in a direction from the engagement point toward a full disengagement of the clutch. If the engagement point denotes a condition of the clutch at the instant of a start of torque transmission by the clutch, and if an essentially progressive increase of the transmissible torque or clutch torque takes place when the clutch is actuated in a direction from such engagement point toward the closed condition, one can refer to negative torques when the clutch is actuated in a sense from the engagement point toward the fully disengaged condition even if the adjustment of the clutch in a direction from the engagement point toward the fully disengaged position is small or minimal and this results in a reduction to zero of the torque which is being transmitted by the clutch. Thus, under such circumstances, a negative torque does not denote that the direction of rotation has been changed, "negative torque" indicates a clutch position or condition between the fully disengaged position or condition and the engagement point. Thus, when a negative torque is selected, the clutch assumes a position or condition between a fully disengaged position or condition and the engagement point so that it is possible that, during adaptation of the engagement point, a drag torque would be transmitted in response to a setting of the clutch to the engagement point which could result in a distortion of the values of engine torque. By selecting a position between the fully disengaged position of the clutch and the engagement point, one achieves that it is possible to measure a value of engine torque at which no drag torque is being transmitted by the clutch. The setting or position of the clutch then serves as a control value or regulating value.

It will be seen that the reference to the selection or setting of a negative clutch torque describes or circumscribes (in a roundabout way) that the clutch is disengaged in such a way that it assumes a disengaged condition which is between the engagement point and the fully disengaged condition or that the clutch is caused to assume its completely disengaged condition.

In accordance with a further novel concept it can be of advantage if the engagement point is ascertained in such a way that the engine torque (y Nm+x Nm) belonging to a particular clutch torque value (0 Nm+x Nm) is ascertained in a stepwise fashion.

The above can be achieved in such a way that, in a first step one ascertains the value (Y Nm) of the engine torque which corresponds to a clutch torque (0 Nm) and one thereupon selects a sampling torque (denoting that torque which is selected for the clutch to test the reaction of the engine) having a value of for example 4 Nm clutch torque. One then ascertains the reaction of the engine, i.e., the magnitude of the engine torque (Z Nm) transmitted as a reaction to selection of the sampling torque for transmission by the clutch. If the difference between the engine torques (z Nm–y Nm) is outside of a tolerance range of clutch torques (0 Nm–4 Nm), the value of the engagement point does not coincide with the value of the real engagement point. The difference or divergence between the differences (z Nm–y Nm)–(0 Nm–4 Nm) can be utilized to ascertain the divergence of the engagement point. In the next step, that value of the engagement point which is utilized in the control unit can be incremented or decremented. By the same token, the utilized value of the engagement point can be altered to match the calculated value of the engagement point. It is further possible to carry out a comparison between several values of the clutch torque and the engine torque. For example, let it be assumed that the clutch torque is set to a value of (4 Nm) and one detects an engine torque of (4 Nm+x Nm). If the clutch torque is reduced to (2 Nm), one detects an engine torque of (2Nm+x Nm). If the clutch torque is reduced to (0 Nm), one detects an engine torque of (x Nm). In the next step, the clutch can be fully opened and the engine torque can be ascertained without the transmission of a drag torque by the clutch. Thus, the value of the engagement point can be ascertained and that value of the engagement point which is utilized by the control unit can be caused to conform or to be adapted to the physical value of the engagement point. The engagement point is calculated in such a way that the engine torque increases accordingly in response to selection of a given clutch torque.

The above described procedures or methods of ascertaining the engagement point and/or of adapting the engagement point or of the stored value representing the engagement point for utilization in connection with the controlling or regulation of the torque transmitting system are based on the premise that there should exist an equilibrium condition of the stationarily operating engine, i.e., that the applied or selected clutch torque is compensated for by the idling regulator in that the engine torque is increased by the value of the clutch torque. For example, this can take place when the vehicle is at a standstill, or when the vehicle is rolling while the transmission is set into a gear ratio or when the transmission is not in gear. In the last instance, one relies on the drag torque of the transmission. If the novel vehicle is operated in the just outlined manner, one proceeds from a basically stationary condition of the engine so that the engine torque cannot be affected by any other influences, i.e., all effects or changes affecting) the clutch torque can be attributed to the selected adjustment of the clutch.

If the condition of the engine is not stationary or is not entirely stationary, such as can take place, for example, during the warming up stage of the engine by idling enrichment or a shifting of the ignition angle, a knowledge of the existence of the reason for the non-stationary behavior of the engine, i.e., a knowledge of the source of disturbance renders it possible to calculate or ascertain the influence of such source of disturbance upon the engine torque; for example, one can calculate or ascertain the development of such source of disturbance as a function of time. For example, when the clutch is fully disengaged, the engine torque can be detected within a given interval of time as a function of time or as a function of another parameter. Such dependency of the engine torque, for example, upon time, can be extrapolated by a function so that such extrapolation is essentially valid and applies within a preselectable following interval of time and the engine torque varies accordingly. Thus, a next-following determination of the engagement point with a setting of a clutch torque and the determination of the engine torque, for example, subsequent to the above outlined procedure, relates to an engine torque which is variable as a function of time. Those values of the engine torque which correspond to the values of clutch torque are ascertained by taking into consideration the basis of the engine torque which varies as a function of time. Basically, such values of the engine torque are no longer variable with time as a reaction to a change of the clutch torque but can be resorted to for a determination of the engagement point.

Based on the previously determined progresses of the engine torque as a function of time or identifications of the timely progress of the engine torque, one can ascertain a change of the engine torque which is not attributable to the selected clutch torque. In this manner, one ascertains an underlying timely progress of the engine torque, Such progress can be relied upon for a determination of the clutch torque.

Based upon the previously ascertained time dependency or time-dependent variation of the engine torque, for example, based on an engine RPM which varies with time, one can thus generate or calculate an engine torque which is constant in time and is independent of the RPM, and such engine torque can be utilized as a basis for the determination and/or adaptation of the engagement point.

Figure 5:
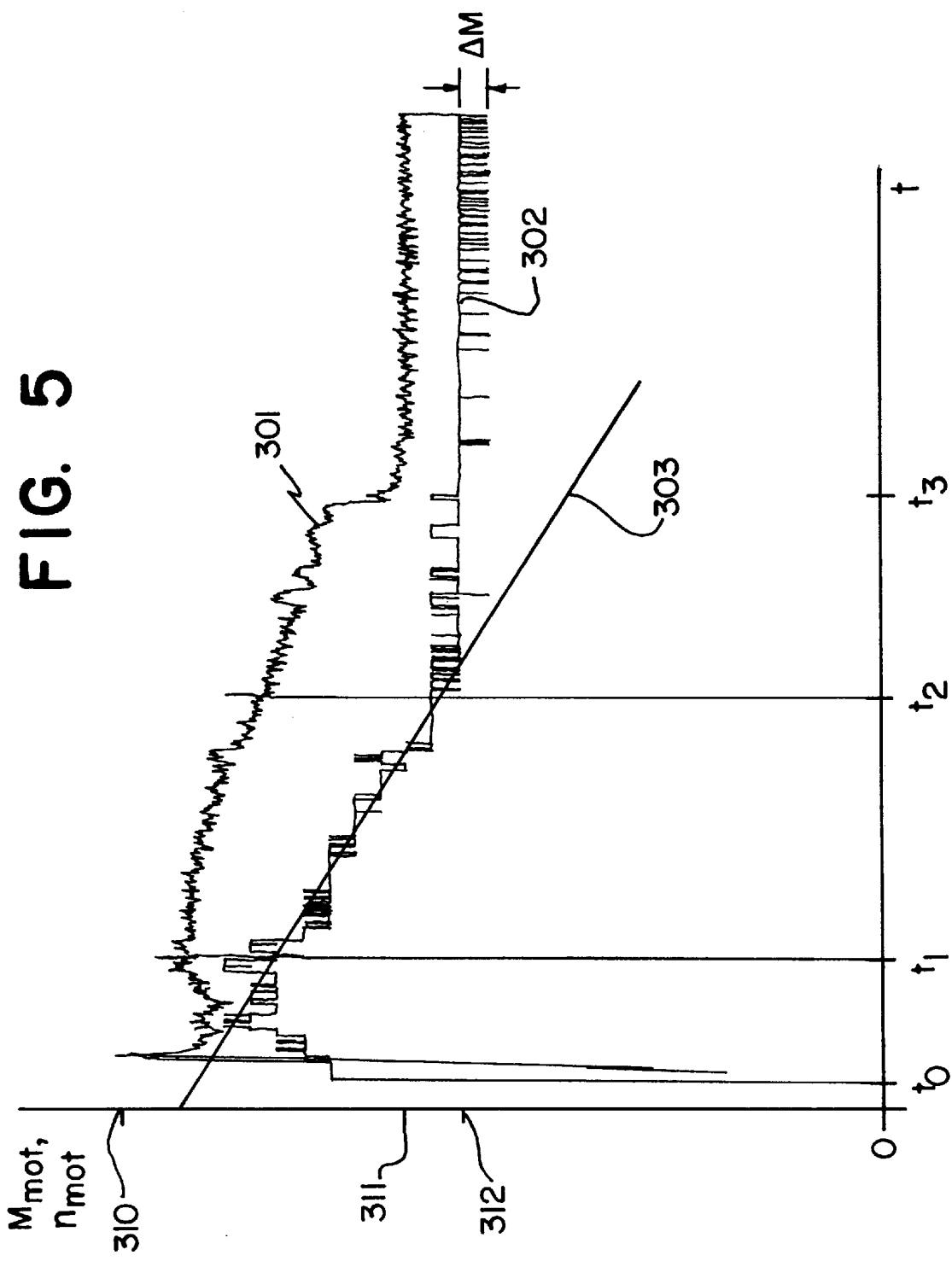
FIG. 5 is a curve of torque v. time.

The coordinate system of FIG. 5 shows the progress of an engine RPM $n_{mot}$ and of an engine torque $M_{mot}$ as a function of time t. At the instant $t_0$, the combustion engine (such as an Otto engine or a Diesel engine or a like engine) is started. The engine RPM 301 and the engine torque 302 increase from a value which basically equals zero to respective first values following the starting of the engine. During such phase an idling enrichment and/or an adjustment of the ignition angle or other procedures will enhance the starting phase or the warming up phase of the engine in a manner which is desirable in the event of a cold start enrichment. The engine RPM $n_{mot}$ (see the curve 301) initially rises from zero to a value 310 to thereupon undergo a basic decrease up to the instant $t_3$ before the engine RPM 301 reaches or assumes its idling value 311 at the instant $t_3$ if the circumstances are normal and the engine is warm. Substantially simultaneously with the time-dependent variation of the RPM 301, namely within the interval from the instant $t_0$ to the instant $t_3$, there takes place a modulation of the engine torque 302 as a function of time, and the engine torque is basically constant from the instant $t_2$ on. The engine torque is available as a digital or a digitalized signal, and the signals fluctuate by a value $\Delta M$. The average value of the engine torque 302 is basically at the value 312. It is also possible to furnish a corresponding analog signal.

During the interval from $t_0$ to $t_2$, the engine torque can be basically approximated by a linear function 303. If a determination of the engagement point is taking place during such time interval, the function 302 can be relied upon as the underlying function and such function can be resorted to in order to convert the calculated engine torque to a basis which is independent of time.

If this is not carried out, it is possible to wait up to the instant $t_3$; from there on. the engine torque is unchanged.

Figure 6:
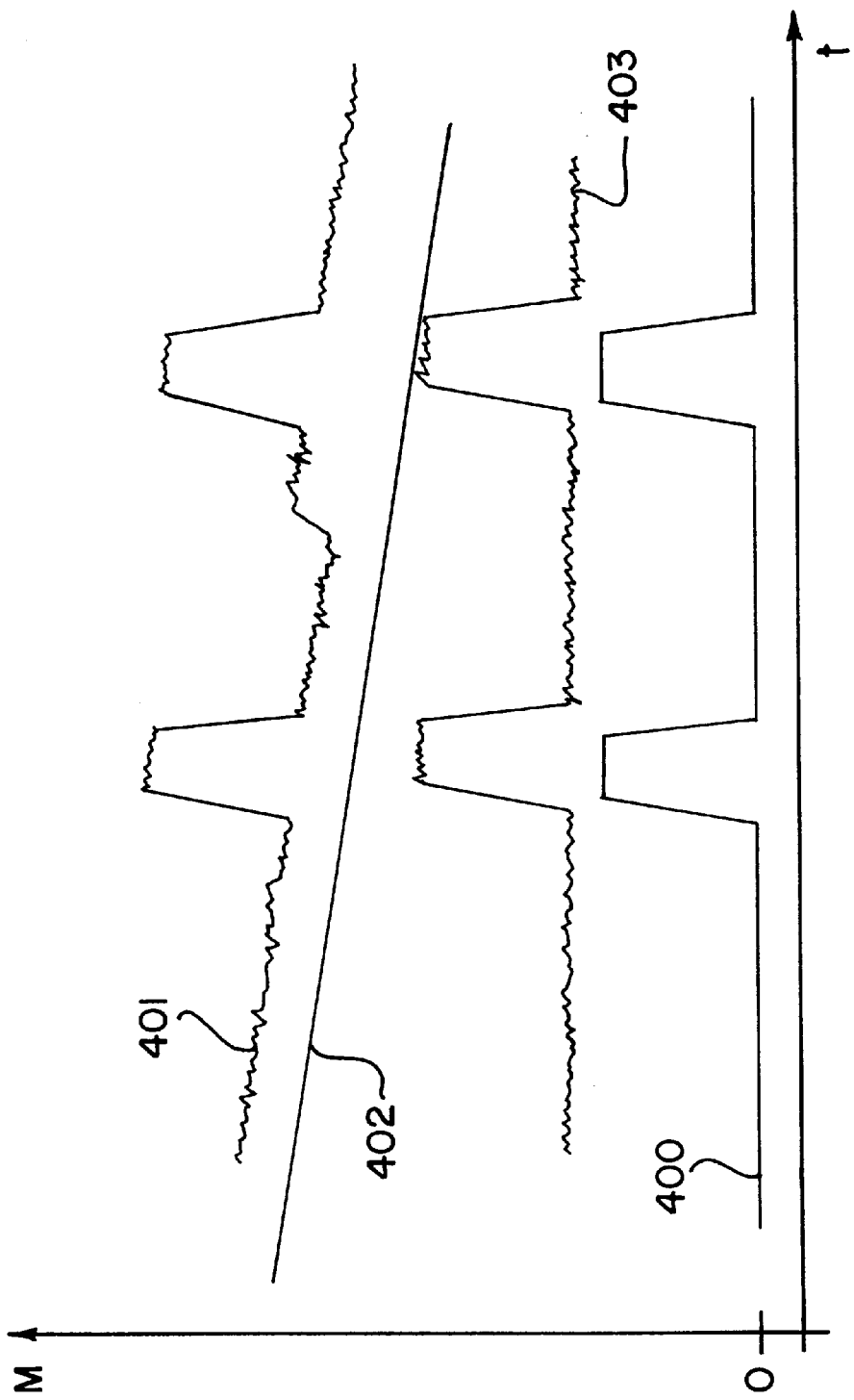
FIG. 6 is a curve of torque v. time.

FIG. 6 shows a coordinate system which is a modification of that shown in FIG. 3. In this coordinate system, the curve 400 denotes the selected clutch torque, the curve 401 denotes the engine torque, and the curve 402 denotes a calculated function as a function of time. The engine torque (curve 401) does not represent a stationary signal such as in FIG. 3 but rather a signal which varies with time t. The straight-line curve 402 corresponds essentially to the time-dependent progress of the engine torque in the absence of load as a result of actuation of the clutch. The absolute value of the function denoted by the curve 402 can be caused to conform to the actual value of the engine torque. For example, the function denoted by the curve 402 can be ascertained on the basis of a determination of data pertaining to the values of the engine torque within a preselectable time window. Due to the determination of the RPM-dependent signal denoting the engine torque (curve 403), which is proportional to the function denoted by the curve 402, one can ascertain or calculate a signal denoting the engine torques and being independent of the RPM. If such signal is available, one can carry out a determination or adaptation of the engagement point, for example, also during idling enrichment. This can be advantageous, for example, during starting of the engine. The function which is denoted by the curve 403 basically corresponds to the signal denoted by the curve 401 minus a value which is proportional to the function denoted by the curse 402. The signal denoted by the curve 403 can be utilized in a manner as already described with reference to the coordinate system of FIG. 3.

Figure 7:
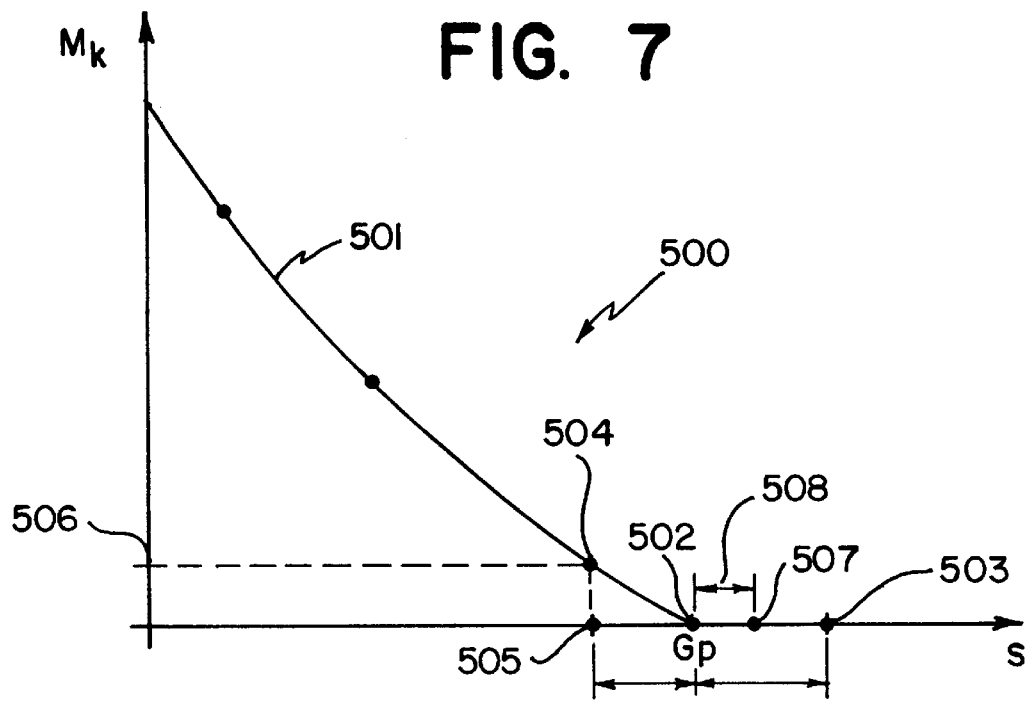
FIG. 7 is a curve of torque v. distance S.

FIG. 7 shows a coordinate system 500 wherein the transmissible clutch torque $M_K$ is shown as a function of the position s of the clutch or a function of the distance s to be covered by an actuator to actuate the clutch. The position or the distance $s_K$ can denote the positions or the distances covered by the tips of the prongs of a diaphragm spring in a friction clutch or the position or distance covered by a clutch disengaging or actuating bearing. However the distance or position s can also denote the distance covered by or the position $s_{Gz}$ of a mobile part of a fluid-operated master cylinder or the position of or the distance $s_{Nz}$ covered by a mobile part of a fluid-operated slave cylinder.

In the coordinate system 500 of FIG. 7, the curve 501 denotes the transmissible clutch torque $M_K$ as a function of the distance s. At the engagement point Gp 502. the value of the curve 501 drops to zero, i.e., the engagement point is or can be defined as that condition of engagement of the clutch or that distance covered by a mobile part of the clutch, such as the pressure plate of a friction clutch, at which the transmission of torque begins. The point 503 denotes that actuating distance or that setting of the clutch when the clutch is fully disengaged. The clutch to which the coordinate system 500 pertains is a push-type clutch, but analogous circumstances will exist in a pull-type clutch.

When its behavior is fully known, and if its characteristic force lines are also known, the characteristic curve of the clutch can be denoted by a point. For example, such point can constitute the engagement point (Gp 502 of FIG. 7 or another point, such as for example the point 504 on the curve 501. For example, if the distance s at a fixed value of the transmissible clutch torque is known, for example, on the basis of a determination of the torque, the entire characteristic curve 501 of the clutch can be ascertained as a function of the actuating distance. If the value of the physical engagement point is shifted, for example, due to a shrinkage or an expansion of a hydraulic fluid in a hydraulic conduit (9) between a master cylinder (11) and a slave cylinder (10), for example, during a measurement of the distance being covered by a mobile part of the master cylinder, a recognition of the position or of the distance covered at a predetermined value 504 of the clutch torque can be resorted to for the purpose of causing the characteristic curve of the clutch basically to approximate or to match the actual circumstances, for example, by resorting to a shifting of the characteristic curve along the abscissa.

In accordance with a further inventive procedure or method, it is possible to ascertain whether or not the value of the engagement point Gp 502 (which is being utilized by the control unit for control or regulation purposes) corresponds to the physical engagement point. Furthermore, it is advisable for the sake of safety to ascertain whether or not a drag torque is being transmitted at a time when the vehicle is at a standstill, the transmission is shifted into a gear ratio, and the clutch is set at the engagement point 502 or in the position 507 which corresponds to the engagement point 502 plus an offset 508. If that value of the engagement point which is utilized by the control unit does not match the physical engagement point, one can transmit a drag torque by setting the clutch at the engagement point 502 or at a value Gp (502) plus the offset. If the transmission is set in neutral, i.e., if no gear ratio is being selected, if the clutch is set to the condition corresponding to a maximal displacement s, and if the transmission is thereupon shifted into a selected gear ratio and the clutch is set to the engagement point Gp or to a value Gp+offset, such procedure can be resorted to for the detection whether or not a drag torque is being transmitted at the setting Gp, or Gp plus offset, of the clutch.

Figure 8:
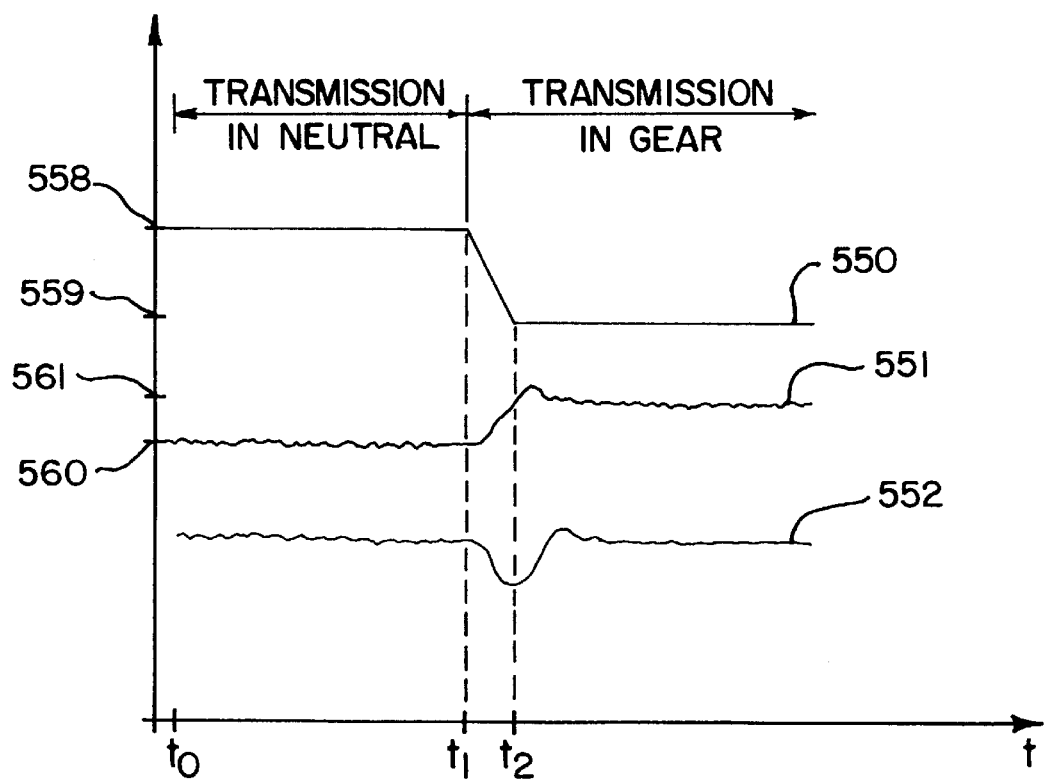
FIG. 8 is a time sequence of signals.

FIG. 8 shows a coordinate system wherein the curve 550 denotes the distances covered by the clutch actuating means, the curve 551 denotes the engine torque, and the curve 552 denotes the engine RPM, all as a function of time t. The transmission (4) is assumed to be in neutral gear during the interval between the instants $t_0$ and $t_1$, and the transmission is assumed to have been shifted into a gear other than neutral gear at the instant $t_1$; from the instant $t_1$ on, the control unit (13) regulates the clutch (3) in such a way that it is engaged at least to a position corresponding to the engagement point Gp or to a position corresponding to the engagement point Gp plus offset (508 in FIG. 7). The progress of the curve 550 in FIG. 8 indicates that, during the interval between $t_1$ and $t_2$, the position of the clutch has been changed from the value 558 to the value 559. The change of the condition of the clutch 3 is basically completed at the instant $t_2$. By measuring or otherwise ascertaining the engine torque $M_{mot}$ (curve 551) and the engine RPM $n_{mot}$ (curve 552), it is possible to ascertain a drag torque $M_{drag}$, which can develop, for example. in that position of the clutch when the transmission is in gear (other than neutral), The drag torque corresponds to the difference between the value 561 and the value 560, i.e., to the difference between the engine torque while the clutch is partially engaged and the engine torque when the clutch is fully engaged. The engine RPM (curve 552) decreases in response to the development of drag torque before the idling regulator counteracts such reduction of RPM and returns the RPM to its desired or required value.

If a drag torque exists when the condition of the clutch is such that it assumes the engagement point Gp or a position denoted by Gp plus offset. the engagement point which is being relied upon by the control unit does not correspond to the actual engagement point because, in such positions or settings of the clutch, the drag torque should be zero or at a minimum or negligibly small value. The engagement point is adapted if a drag torque develops. The adaptation can be carried out incrementally or decrementally, in dependency on the magnitude of the drag torque.

It is also possible, for example, in order to eliminate drag torque, to change the value of the offset (508 in FIG. 7), namely one can increase the value of the offset.

Figure 9:
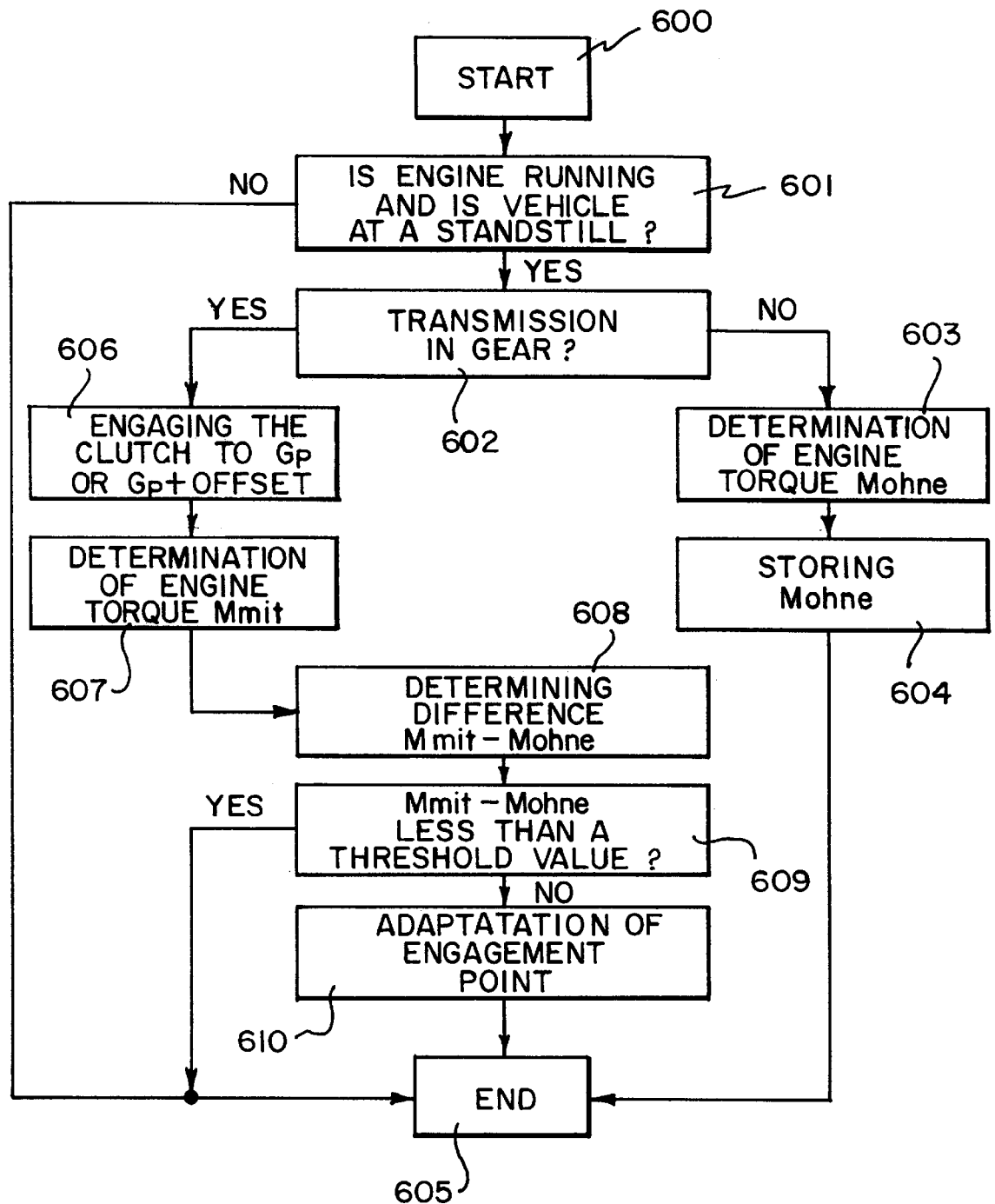
FIG. 9 is a flow chart of torque measurement and engagement point determination.

FIG. 9 is a flow chart of the various steps or stages of the determination of the presence or absence of drag torque which was discussed with reference to FIGS. 7 and 8. The procedure is started at step 600. At step 601, a determination is made by the control unit and on the basis of signals from sensors and system input values. whether or not the engine is on and whether or not the vehicle is at a standstill. This can be ascertained, for example, on the basis of the engine RPM and the wheel RPM. If this is the case, i.e., if the engine is on and the vehicle is at a standstill, the system proceeds to step 602; alternatively the procedure is terminated (note the block 605) within the particular interval of time. At step 602, it is determined whether or not the transmission is in gear or is in neutral. If the transmission is in a gear other than neutral, the engine torque is ascertained (step 603) and the thus obtained value $M_{ohne}$ of the engine torque is stored at step 604; it is preferred to simultaneously store the cycle or the time of storing the value $M_{ohne}$. The procedure is then terminated at step 605, within the particular cycle. If the inquiry at step 602 indicates that the transmission is in a gear other than neutral. a further inquiry serves to ascertain whether or not the transmission was in a gear other than neutral during the preceding cycle. For example, this can be ascertained by addressing a status bit which was not changed as yet during the then prevailing cycle and which can indicate whether or not the transmission was in a gear other than neutral during the preceding cycle. If the inquiry indicated that the transmission was in neutral, this indicates that the shifting into a gear other than neutral took place very recently. If this is the case, at step 606 the clutch is set from basically a fully disengaged condition to the engaged position Gp or Gp plus offset. In either event, no drag torque or no appreciable drag torque should exist at such time. Next, at step 607 the engine torque $M_{mit}$ is determined and then stored. Next, at step 608, the difference between $M_{mit}$ and $M_{ohne}$ is determined. This difference $M_{mit}$–$M_{ohne}$ corresponds to the drag torque $M_{drag}$ when the transmission is in a gear other than neutral. At step 609, the difference $M_{mit}$–$M_{ohne}$=$M_{drag}$ is compared with a threshold value. If the value of the drag torque $M_{drag}$ exceeds such threshold value, the engagement point is adapted (step 610), or the offset is altered (step 606), particularly increased, so that the existing drag torque is reduced. The procedure for this particular cycle is terminated at step 605.

Figure 10:
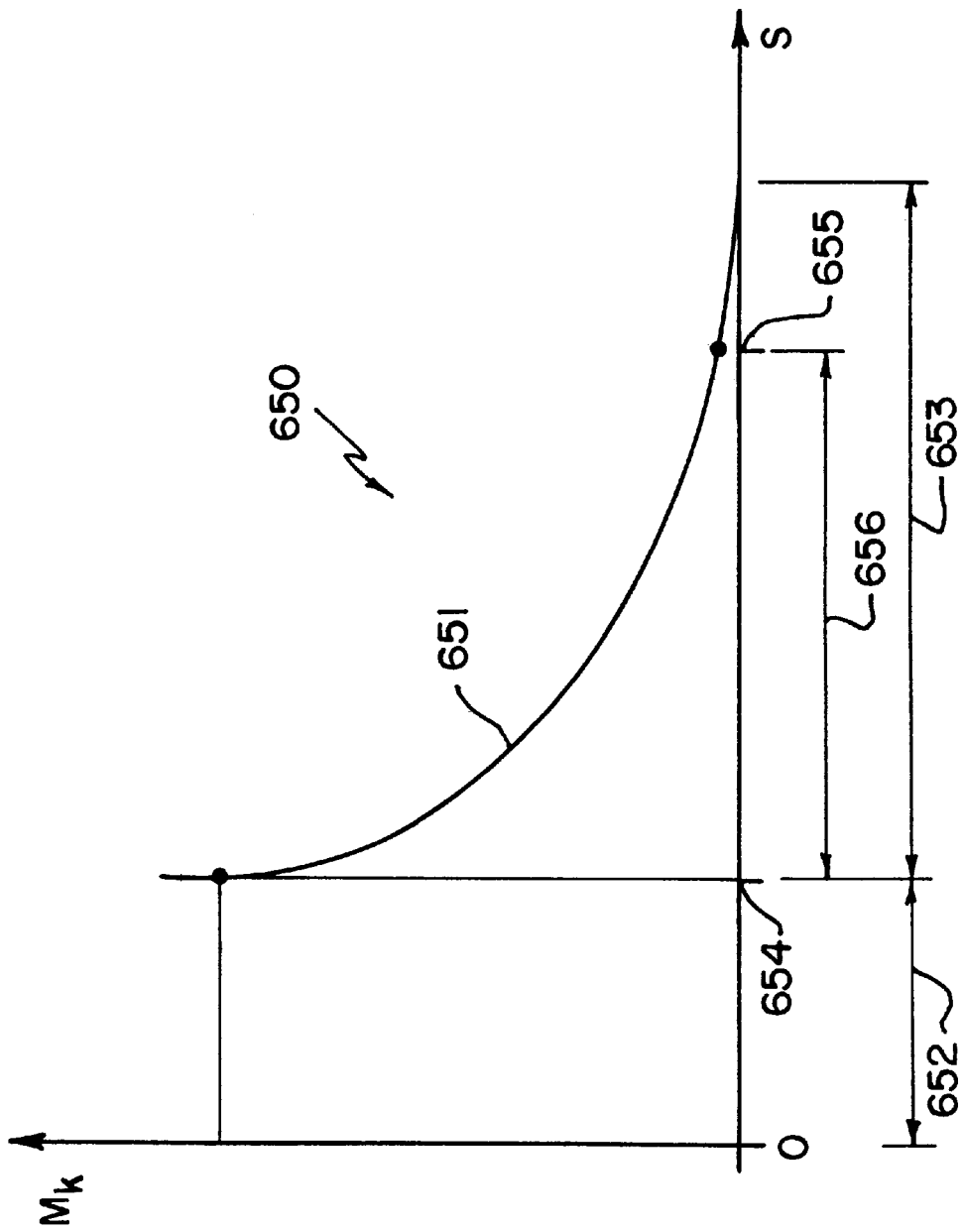
FIG. 10 is a curve of torque v. distance S.

FIG. 10 shows a coordinate system 650 wherein the torque $M_K$ which can be transmitted by the clutch is measured along the ordinate and the distance s is measured along the abscissa, i.e., the torque $M_K$ is a function of the distance s. The distance s can be that distance which is covered, for example, by the tips of tongues forming part of a diaphragm spring in a friction clutch and/or the distance covered by a clutch disengaging member and/or the distance covered by a mobile part of a master cylinder and/or a distance covered by a mobile part of a slave cylinder. The value of s denotes the actuation or lack of actuation or the extent of engagement of the clutch. In order to be able to complete the determination of the engagement point as rapidly as possible, and to obtain a reliable value for the position of the engagement point, it is desirable to select an appropriate starting value for the determination of the engagement point and to thereupon determine the engagement point, for example, in an iterative manner. In this connection, it can be of advantage if, initially, the value of the engagement point is ascertained as the anticipated value on the basis of a theoretically expectable, i.e. adapted to be anticipated, characteristic curve. The curve 651 of FIG. 10 denotes such a characteristic curve and comprises a first portion 652 in which, basically, no modulation of $M_K$ as a function of s exists. In a second portion 653, modulation of $M_K$ is carried out as a function of s, i.e., in this portion the torque which can be transmitted by the clutch decreases basically monotonously as a function of s. The value of the clutch actuating distance at 654 corresponds to a neutral point at which the transmissible torque no longer increases in response to further engagement of the clutch. Thus, the engagement point 655 (defined here as the engagement distance at a predetermined transmissible torque, e.g., 9 Nm) denotes a theoretical engagement point. Such theoretical engagement point Gp corresponds to the neutral point plus the nominal engagement point 656 which, in turn, denotes the difference between 654 and 655 and thus denotes a distance.

The balance or sum of torques at the engine during unchanging idling essentially represents the basis for a determination of the engagement point. Furthermore, and based on the aforedescribed circumstances, it is possible to carry out a determination of the engagement point even if the idling is not unchanging by taking into consideration the cause of the non-constant progress of idling. When the engine is idling in an unchanging manner, the angular momentum or torsion of the engine is simplified if one disregards other consumers such as for example, the air conditioning unit, to an equilibrium between the engine torque and the clutch torque:

$M_M$=$M_K$ with $\Theta_M$*dω/dt=0.

The condition of equilibrium indicates that a rise of the clutch torque $M_K$ should effect an equivalent rise of the engine torque. The setting of the engagement point is considered to be correct when a predetermined change of the clutch torque $M_K$ entails a corresponding rise of the engine torque which has been selected or caused by the engine controls. The engine controls and the detection of the engine torque $M_M$ thus basically serve as a sensor for the selected transmissible clutch torque $M_K$.

FIG. 3 illustrates by way of example a determination of the engagement point which involves a determination of the engine torque at two different clutch torques and the difference between the thus obtained values of the engine torque serves for the determination of the engagement point by taking into consideration the selected clutch torque.

Figure 11:
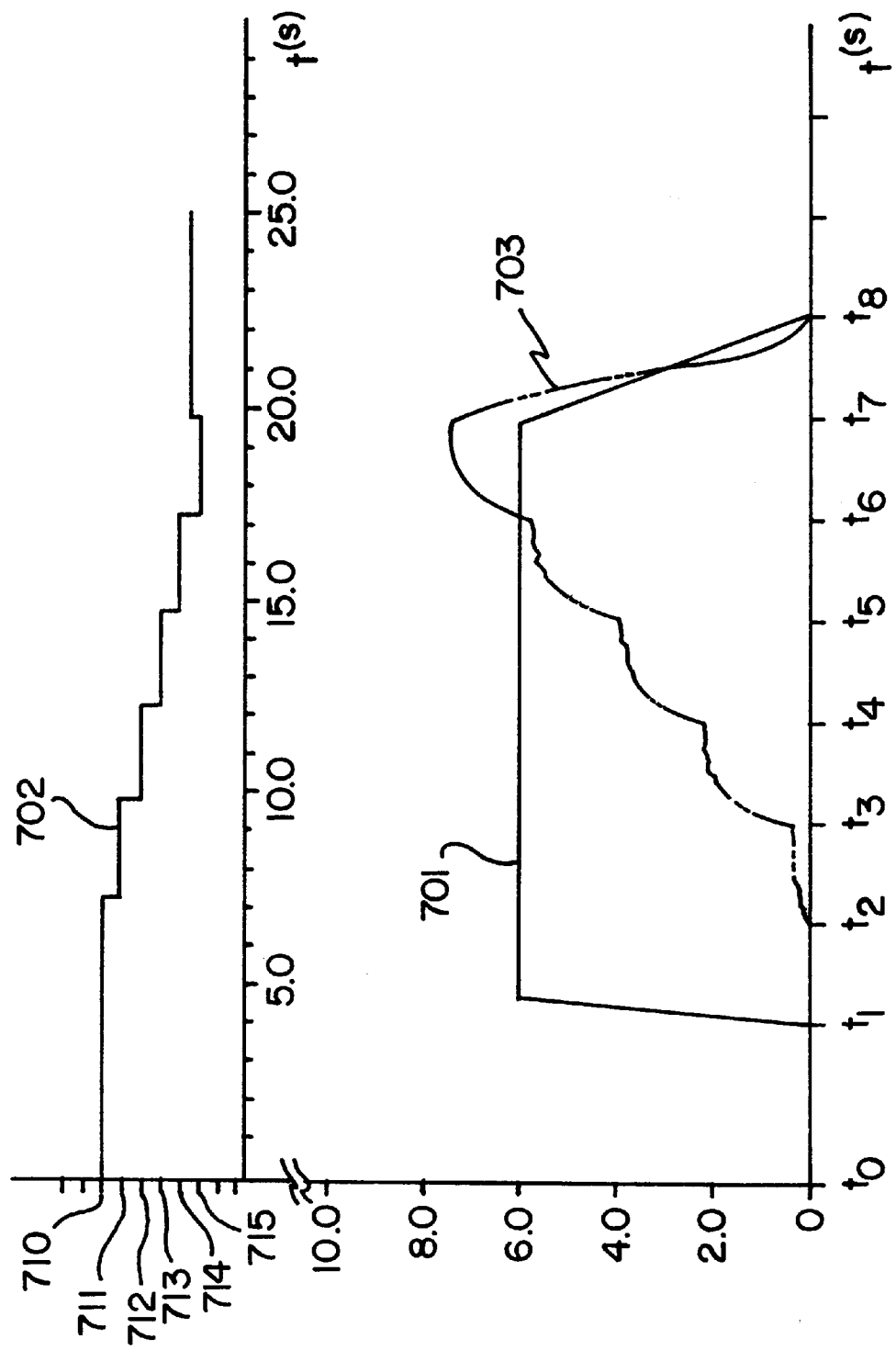
FIG. 11 is a time sequence of signals.

FIG. 11 illustrates a coordinate system wherein time t (in seconds) is measured along the abscissa and the torque is measured along the ordinate. The curve 701 denotes a selected desired clutch torque which is determined on the basis of the actually stored value of the engagement point 702, such as is stored by the control unit, as a function of time t. The clutch torque 701 is a sampling torque which is applied for the purpose of determining the engagement point. Furthermore, such value of the engagement point 702, which is utilized by the control unit, is indicated as a function of time. FIG. 11 further shows, in addition to the aforementioned parameters, a curve 703 which denotes the engine torque $M_{mot}$ as a function of time t. As already mentioned above, "sampling torque" denotes that selected clutch torque which is applied to test the reaction of the engine During the time interval between the instants $t_0$ and $t_1$, the engagement point 702 which is utilized by the control unit is set to a value 710 and is stored. At the instant $t_1$, one starts with a determination of the engagement point and, by using the value 710 for the engagement point, one selects a desired clutch torque of 6 Nm. Starting from the actually utilized value of the engagement point, the clutch is engaged or closed by a precalculated value beyond the engagement point 710 in order to select the desired clutch torque $M_{Ksoll}$. Thus, the control unit "assumes" that the transmissible torque amounts to 6 Nm.

As shown in FIG. 11, the detected engine torque, indicated by curve 703, does not assume any detectable value during the interval between the instants $t_1$ and $t_2$. Thus, and based on the preceding equation denoting the conditions for an equilibrium, the control unit utilizes for the engagement point a value 710 which does not match or correspond to the real engagement point. At the instant $t_2$, the control unit reduces the value of the utilized engagement point from 710 to 711. Since, at the instant $t_2$ or during the interval between $t_2$ and $t_3$, the transmissible desired clutch torque $M_{Ksoll}$ did not change in comparison with the previously selected desired clutch torque $M_{Ksoll}$, the change of the utilized value of the engagement point from 710 to 711 denotes that the position of the clutch or the condition of engagement is being changed in accordance with the newly selected engagement point so that, as a result, the desired clutch torque will remain essentially unchanged.

During the interval between $t_2$ and $t_3$ (it being assumed that 711 denotes the value of the engagement point as well as that the desired clutch torque is set at 6 Nm), one ascertains the engine torque. It will be seen that, at $t_3$, the engine torque assumes a very low value which is well below the desired clutch torque (6 Nm). Thus, the value 711 of the engagement point is not, as yet, the proper or correct value of the physical engagement point. Furthermore, the value 711 is not within a tolerance range from the correct value for the engagement point. Thus, and since the engagement point shown at 711 departs excessively from the real engagement point, the control unit decrements the utilized value of the engagement point starting at $t_3$. As can be seen in FIG. 11, the value of the engagement point utilized by the control unit is changed from 711 to 712 during the interval between the instants $t_3$ and $t_4$. Upon completion of such decrementing of the engagement point, the desired clutch torque of 6 Nm is set with the newly fixed value of the engagement point and one ascertains the engine torque (curve 703) during the interval between $t_3$ and $t_4$. When $t=t_4$, the engine torque assumes a value of approximately 2 Nm, i.e., such value is well below the desired value of 6 Nm, which is the magnitude of the desired clutch torque.

Thus, the value 712 of the engagement point is still not the correct value, namely the value of the physical engagement point. Furthermore, the value 712 is not within the range of acceptable tolerances (between the engagement point utilized by the control unit and the physical engagement point). Thus, and since the departure of the engagement point shown at 712 from the real engagement point is excessive, that value of the engagement point which is utilized by the control unit is decremented again starting at $t_4$. Thus, the value 713 is selected for the interval between the time instants $t_4$ and $t_5$. Subsequent to such adaptation, i.e. decrementing or, if necessary, incrementing, of the utilized engagement point, the desired clutch torque of 6 Nm is set with the newly selected value 713 for the engagement point and the engine torque (curve 703) is ascertained during the interval from $t_4$ to $t_5$. As can be seen in the example of FIG. 1;, when $t=t_5$, the engine torque assumes a value of approximately 4 Nm which again, is well below the value (6 Nm) which would denote an equality of clutch torque and engine torque.

Thus, the value 713 of the engagement point is still different from the value of the physical engagement point. Furthermore, the value 713 is still outside of an acceptable range of tolerances between the value of the engagement point as utilized by the control unit and the value of the physical engagement point. Therefore, the value of the engagement point (as represented at 713) is decremented (or, if necessary, incremented) at the instant $t_5$. The thus obtained value 714 is utilized by the control unit during the interval between $t_5$ and $t_6$ to set the desired clutch torque of 6 Nm, and the value of the engine torque is ascertained during the interval between $t_5$ and $t_6$. As can be seen in FIG. 11, the value of the engine torque rises to 5.75 Nm which is still somewhat less than the desired clutch torque of 6 Nm.

Accordingly, the value 714 of the engagement point which is utilized by the control unit is still not identical with the value of the physical engagement point. Furthermore, the value (as shown at 714) is still not within an acceptable range of tolerances. Therefore a further adaptation (decrementing or incrementing depending upon the sign of the deviation) is initiated at $t_6$ to obtain a new value 715 which is utilized by the control unit in connection with the setting of the desired clutch torque of 6 Nm. The engine torque (curve 703) is monitored during the interval between $t_6$ and $t_7$: FIG. 11 shows that the engine torque amounts to 7.5 Nm, i.e., for the first time such value is above the desired value (6 Nm) of the clutch torque. This indicates that the physical engagement point of the clutch is between the values 714 and 715.

In order to decide which value of the engagement point is to be utilized at least for the first time, the invention provides several possibilities, such as:

1. The last ascertained value of the engagement point, namely the value 715, is stored and is utilized, at least temporarily, as that value of the engagement point which is to be relied upon by the control unit. Thus, such value (715) is that utilized value at which, for the first time, there develops a change in the sign, i.e. between positive and negative, between the engine torque and the clutch torque.
2. The next-to-the-last selected value of the engagement point, as utilized by the control unit, was that shown at 714 in the coordinate system of FIG. 11. Such value was stored and was utilized, at least temporarily, by the control unit as a value denoting the engagement point. The value 714 is the last value which was utilized by the control unit without effecting a change in the sign of the difference between the engine torque and the clutch torque.
3. There is ascertained a median value between the two last ascertained values (714, 715), and the thus ascertained median value is stored and utilized, at least temporarily, as that value of the engagement point which is being utilized by the control unit. It will be seen that the median value (714+715)/2 is obtained by utilizing the value (714) which was the last value that did not cause a change ($s_V$) of the sign of the difference between the engine torque and the desired clutch torque, and the value (715) which was the first value to cause such a change ($s_N$) of the sign.
4. An interpolation is carried out between the two last determined values (714 and 715) of the engagement point, and the thus obtained value is stored to be utilized at least temporarily, by the control unit as a value denoting the engagement point. The interpolated value is obtained on the basis of that utilized value at which the difference between the engine torque and the clutch torque did not indicate a change of sign (for the last time), and on the basis of that utilized value (715) of the engagement point which, for the first time, indicated a change of the sign. The departures of the engine torque at (Gp=714 or at Gp=715 from the desired clutch torque (of, for example, 6 Nm) can be considered as weighting factors. The interpolation can be linear, square (second degree) or in accordance with another predeterminable or preselectable function.

Once the engagement point has been ascertained and the at least temporarily utilized value of the engagement point has been stored, the desired clutch torque is reduced at least substantially to zero prior to a renewed actuation of the clutch for a further adaptation of the engagement point or due to a changed condition of the motor vehicle.

During the individual time phases, the engine torque can be processed to assume an average value and the averaged value of the engine torque can be compared with the desired clutch torque.

The length of the steps during incrementing or decrementing in the course of changing the engagement point (which is being utilized by the control unit) between individual time intervals can be fixed, for example to values in the range of between 0.02 mm to 1 mm. However, it is also possible that the increment/decrement depends from the ascertained value of the engine torque. For example, the engine torque range can be divided or broken up into discrete partial ranges, and a different increment/decrement can be selected for each such partial range. This can be of advantage because one can utilize larger increments/decrements when the values of the engine torque are relatively small and one can use smaller increments/decrements when the value of the engine torque is higher. For example, this renders it possible to achieve the desirable and advantageous result that the number of steps can be minimized in connection with a determination of the engagement point. It is also possible to make the length of the steps or the value of an increment/decrement dependent upon the departure of the ascertained engine torque from the desired clutch torque. For example, the length of the steps can bear a functional relationship with, such as being a percentage of, the departure.

Figure 12:
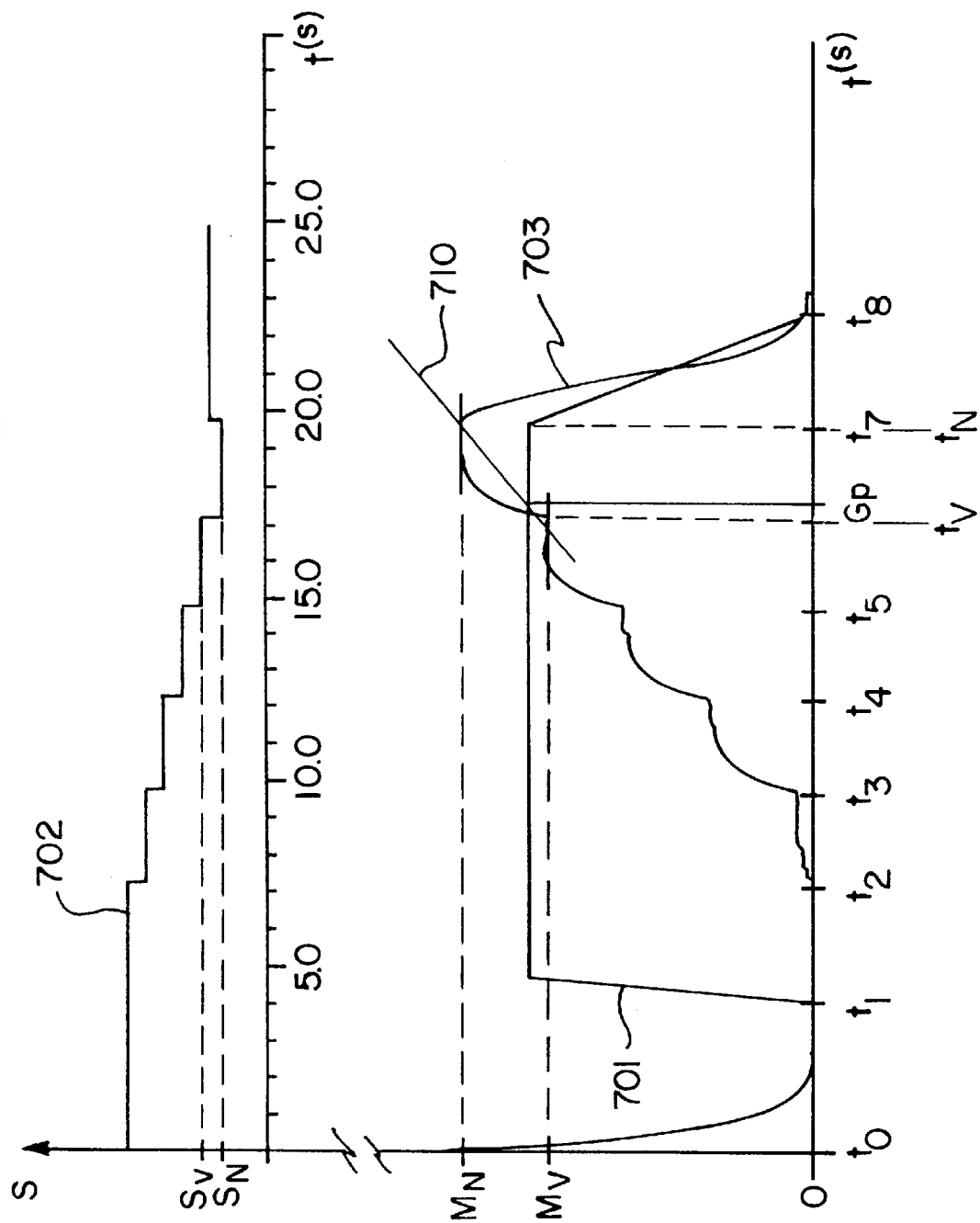
FIG. 12 is a time sequence of signals.

FIG. 12 illustrates a different embodiment of the invention wherein the engagement point is ascertained by linear interpolation between the engagement point value $M_V$ before and the engagement point value $M_N$ after, i.e, at opposite sides of, the actual engagement point Gp. The values $M_V$ and $M_N$ were ascertained by resorting to stepwise incrementing/decrementing, as discussed with reference to the description of FIG. 11. The value $M_V$ corresponds to that value of the engine torque, as shown by the curve 703 in FIG. 11, which was detected prior to reaching the desired clutch torque $M_{Ksoll}$ (curve 701 in FIG. 11), and the value $M_N$ corresponds to that value of the engine torque which was detected subsequent to reaching (by the engine torque) or surpassing of the desired clutch torque $M_{Ksoll}$. The desired clutch torque $M_{Ksoll}$ serves as a sampling torque which is being applied in order to detect the reaction of the engine torque.

A linear interpolation (as indicated in FIG. 12 by a straight-line curve 710) takes place between the values $M_N$ and $M_V$. The engagement point value or engagement value $s_V$ is available at the torque value $M_V$, and the engagement point value or engagement value $s_N$ is available at the torque value $M_N$. The times $t_V$ and $t_N$ are utilized as auxiliary points for the purposes of illustration and calculation. The instant $t_V$ corresponds to the instant $t_6$, and the instant $t_N$ corresponds to the instant $t_7$.

The following linear equations are valid for the values $M_V$ and $M_N$ of the engine torque:

$$M_V = a*s_V + b$$

$$M_N = a*s_N + b$$

wherein the parameters $M_N$, $M_V$, $s_N$ and $s_V$ can be ascertained by referring to FIG. 12. The values $M_N$ and $M_V$ correspond to the values of the engine torque prior and subsequent to reaching of the predetermined desired clutch torque $M_{Ksoll}$, and the parameters $s_N$ and $s_V$ denote set clutch positions s prior and subsequent to reaching of the predetermined desired clutch torque $M_{Ksoll}$.

The following equations apply for the summands and factors a, b:

$$a = \frac{M_N - M_V}{s_N - s_V}$$

$$b = \frac{(M_N - M_V)*s_V}{S_n - S_V}.$$

The following equation is valid for the engagement point Gp which is ascertained by linear interpolation, with the values of $M_N$, $M_V$, $s_N$, $s_V$ and the sampling torque $M_{Ksoll}$:

$$Gp = \frac{\left(M_{Ksoll} - M_V + \frac{M_N - M_V}{S_n - S_V} * (s_N - s_V)\right)}{M_N - M_V}$$

The value of the engagement point which is being utilized by the control unit can be adapted in accordance with such value Gp of the engagement point.

By resorting to linear interpolation, the engagement point can be adapted with a higher degree of accuracy or, alternatively, by resorting to the above outlined procedure involving an incremental or decremental adaptation of the engagement point, one can realize a more rapid carrying out of an adaptation. For example, by resorting to an interpolation of the engagement point Gp, the length of the steps during incrementing/decrementing can be increased and one can still achieve a relatively high degree of accuracy.

Figure 13:
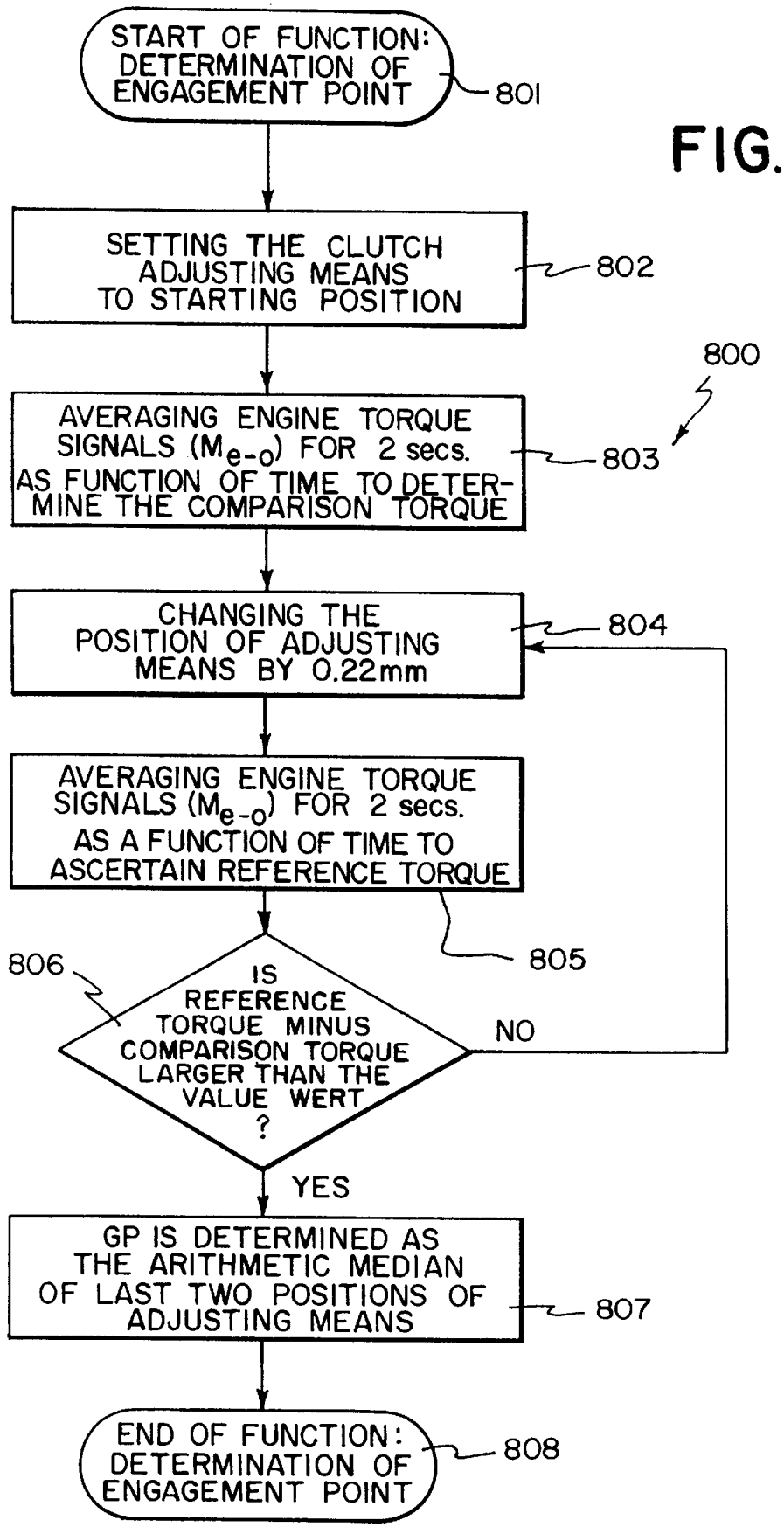
FIGS. 13, 13a and 14 are flow charts of torque measurement and engagement point determination.
Figure 13A:
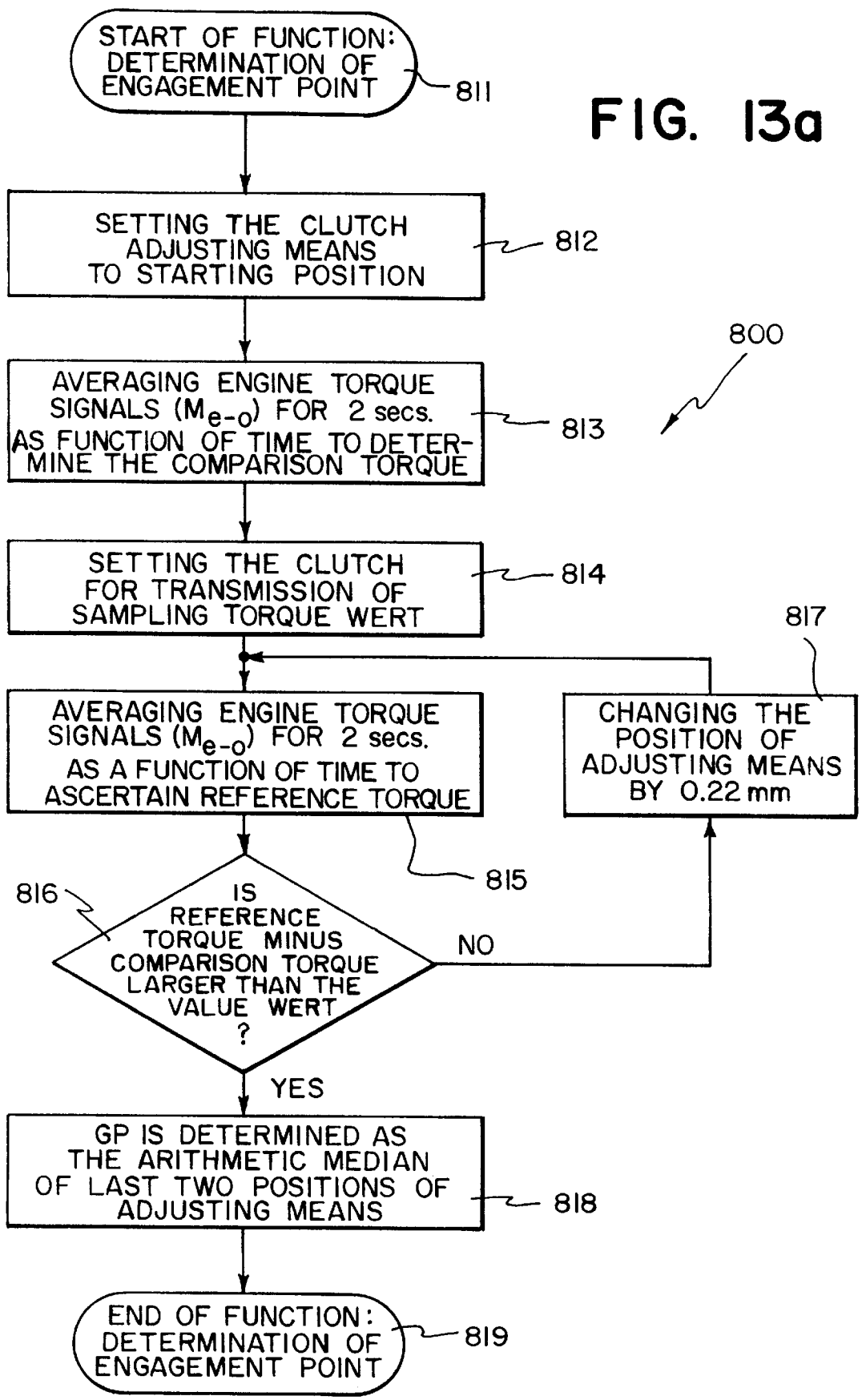
Figure 14:
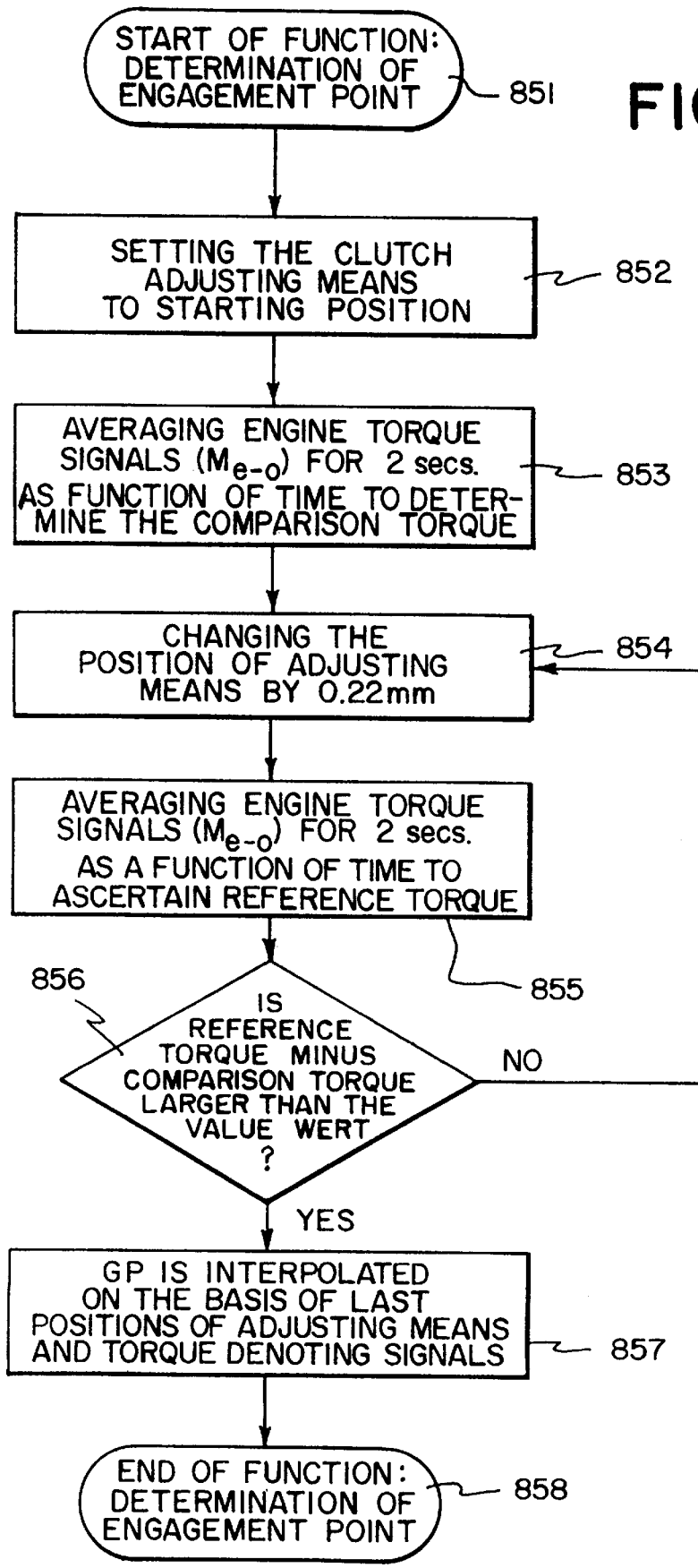

FIGS. 13, 13a and 14 respectively show flow charts 800, 810 and 850 denoting additional progresses of the novel determination and/or adaptation of the engagement point.

Step 801 in the flow chart 800 of FIG. 13 denotes the start of a determination of the engagement point. At step 802, the torque transmitting system (3) is set to a preselectable engagement position. Such position can be a preselectable position, such as an engagement point which has been selected in advance, or another preselected position. Next, at step 803, an averaging is performed of the detected engine torque for a preselected interval of time Δt, and the resulting engine torque is stored as a comparison torque. At such time, the clutch is set basically not to transmit any torque. At step 804. the engaged condition of the clutch is changed by a value Δs, for example toward the engaged or closed position starting from a previously selected value. For example, one can select a value Δs of 0.2 mm. At step 805, an averaging is performed, for a time interval Δt, of the engine torque which has been detected or ascertained in such position, and the resulting or averaged engine torque is stored as a reference torque. Next, at step 806, a difference between the reference torque and the comparison torque is determined, and such difference is compared with a preselectable value WERT. If the difference exceeds WERT, the system proceeds to step 807, to ascertain the engagement point Gp from the arithmetic median of the last two positions of the clutch or of the actuating means therefor, and step 808 denotes a completion of the determination of the engagement point within the particular cycle. Alternatively, if the difference at step 806 does not exceed WERT, the system loops back and the position of the clutch or of the actuating means therefor is altered at step 804, and the reference torque is determined anew, as indicated by at step 805.

Step 811 in the flow chart 810 of FIG. 13a denotes the initiation of a determination of the engagement point. At step 812 of FIG. 13a the torque transmitting system (such as 3) is set to a preselectable position of engagement. This position can be a preselectable position, such as a previously determined engagement point, or another preselected position. Next, at step 813 of FIG. 13a, the engine torque which has been determined at such time is averaged during a preselectable interval Δt, and the resulting engine torque is stored as a comparison torque. At such time, the clutch transmits a small torque or no torque at all. At step 814 the condition of the clutch is altered toward the engaged position by the value WERT which is added to the value denoting the engagement point. Next. at step 815 the engine torque which has been detected or otherwise ascertained at such time is averaged for a preselectable interval of time Δt. and the resulting engine torque is stored as a reference torque. At step 816, a difference between the reference torque and the comparison torque is determined, and such difference is compared with a preselectable value WERT. If the difference exceeds WERT, the engagement point Gp is ascertained (step 818) from the arithmetic median of the last two positions of the clutch or of the actuating means before the determination of the engagement point is terminated at step 819. Alternatively, if the difference at step 816 does not exceed the value WERT, the engagement condition of the clutch is altered by an amount Δt, as indicated at step 817;

for example, it shifted from the previous setting toward a more engaged condition. For example, the value of Δt can be in the range of 0.2 mm. The system then proceeds to the next step (step 815), where the reference torque is determined anew, and at step 816 the difference between the reference torque and the comparison torque is compared with the value of WERT.

Step 851 in the flow chart 850 of FIG. 14, indicates the initiation of a determination of the engagement point. At step 852 the torque transmitting system, such as the clutch 3, is set to a preselectable condition of engagement. This condition can be a preselectable position, such as a previously determined engagement point, or another preselected position. Next, at step 853 the engine torque, which has been detected at such time, is averaged for a preselectable time interval Δt and the resulting engine torque is stored as a comparison torque. At such time, the clutch transmits a minimal torque or no torque at all. At step 854 the engagement of the clutch is changed by a value Δs, such as for example starting from the previously selected value. For example, the value of Δs can be about 0.2 mm. Next, at step 855 the engine torque which has been detected or otherwise ascertained at such time is averaged for a selectable time interval Δt, and the resulting torque is stored as reference torque. The system then proceeds to step 856 where the difference between the reference torque and the comparison torque is first established, and such difference is thereupon compared with a preselectable value WERT. If the difference exceeds the value of WERT (step 857), the engagement point Gp is ascertained from the arithmetic median of the two last positions of the clutch or from the last two positions of the adjusting means for the clutch. The determination of the engagement point during the respective cycle is thereupon terminated, as indicated at step 858. Alternatively, if the difference at step 856 does not exceed the value of WERT, the system loops back to step 854 where the position of the clutch or of the actuating means therefor is altered, and the reference torque is determined anew, as indicated at step 855.

As already described above, by calculating starting from the engagement point which is being actually utilized by the control unit, one can select or apply a sampling torque such as the desired clutch torque $M_{Ksoll}$, and thereupon detect the reaction of the engine torque as an indication of the transmissible torque and hence of the engagement point.

Such sampling torque is selected to match a preselectable value WERT so that the reaction of the engine torque assumes a readily achievable value. Furthermore, the reaction of the engine torque to the sampling torque should not be too pronounced. The procedure of determining the engagement point can be interrupted and a new sampling torque can be determined if the reaction of the engine torque to the sampling torque exceeds a predeterminable threshold value. Thereupon, one can select a new sampling torque by taking into consideration the preceding sampling torque and the raised engine torque.

The above can also be desirable when one selects a creeping operation, for example, when the start of the creeping operation is too pronounced or takes place with an excessive torque because the real engagement point deviates from the engagement point which is being considered by the control unit. For the sake of safety, it is desirable to further disengage the clutch at least slightly when the torque reaction is too pronounced due to the selection of a relatively small creeping torque. In this context, a creeping operation is intended to denote a partial closing of the clutch so that the vehicle can proceed to creep, slowly, while the gas pedal is not depressed, while the brake is not actuated, while the engine is running, and while the transmission has been shifted into an active (other than neutral) gear ratio.

The relied upon parameters and values can be detected by resorting to sensors or, for example, by way of data transmission from another electronic unit or from a data bus such as a CAN-bus.

An adaptation of the engagement point is desirable in order to compensate for or to balance thermally induced and/or wear-induced shifting of the characteristic curve of the clutch (i.e., of the torque transmitting system). For example, the adaptation of the engagement point can be carried out while the vehicle is at a standstill. The following conditions can be satisfied in order to initiate an adaptation of the engagement point:

idling switch: ON main brake: ON transmission RPM: 0[1/min]

desired clutch torque: 0[Nm]

the clutch temperature, as calculated by resorting to a temperature model, should be uncritical, preferably below a threshold temperature of for example 300° C. The present invention further encompasses the invention disclosed in the earlier-filed German application DE 19602006 the disclosure of which is intended to be incorporated herein by reference.

The adaptation of the engagement point generates a cyclical sampling signal or a sampling torque which is transmitted by the clutch and has a duration of, for example, 10 to 30 seconds. During the sampling cycles, the clutch is first fully disengaged or opened and is thereupon engaged for an interval of 1 to 10 seconds to transmit a desired torque of 3 to 20 Nm. The signal which denotes the engine torque is being detected first while the clutch is disengaged and thereupon for an interval of 1 to 10 seconds while the clutch is engaged, and the thus obtained signals denoting the engine torque can be thereupon averaged. If the difference between the two averaged values exceeds the preselected clutch torque, one adapts the short-lasting engagement point. The actual value of the increment is a linear function of the difference between the increases of the engine torque and the clutch torque. It amounts maximally to +/−0.01 to 2.0 mm.

If, at the time of evaluation of the balance of the clutch torque and the engine torque, the last snifting step has been completed not more than 5 to 600 seconds before, one also adapts the long-range engagement point. The increment which is being utilized for such purpose is smaller than that for the short-lasting value of the engagement point by a factor of 1.1 to 20.

In this manner, the control unit can store for example two engagement point values each of which can be put to use.

The long-range engagement point value denotes, as a rule, the irreversible long-range changes of the engagement point, for example those which are attributable to wear upon or setting of the clutch or its diaphragm spring. The stored short-range engagement point is indicative, as a rule, of reversible short-lasting changes of the engagement point, for example, those which are attributable to temperature changes of the fluid column within the hydraulic system of the actuating means for the clutch, as indicated by the conduit 9 in FIG. 1.

If a snifting operation is being carried out, such as an equalization of volumes in the fluid-containing connection of the actuating, means, the control unit shifts from the stored short-lasting engagement point to the stored long-range engagement point because, as, a rule, an equalization of volumes normally effects a shifting to the stored long-range engagement point. The short-lasting stored value can be altered thereafter as a result of reversible changes.

The operating point of a vehicle having an apparatus for actuation or selection or operation of an automated torque transmitting system, such as for example a clutch, is a condition of the vehicle in the presence of parameters. The operating point is defined by the parameters of the vehicle, such as for example, the shifting of the transmission into a given gear ratio, an actuated brake, an engine RPM a vehicle speed, a transmission RPM the absence of a change of the engine torque, the non-existence of an intent to shift the transmission into a different gear ratio (i.e., non-actuation of the gear shifting lever), the absence of depression of the gas pedal or of a value of gas pedal actuation. the existence of acceleration, the driving in forward or reverse, a shifting operation or a driving condition while the vehicle speed remains unchanged, or an increase or reduction of the speed of the vehicle. A detection or an adaptation of a value of the engagement point can take place as a function of the values of such parameters of the vehicle.

The claims which are filed with this patent application are merely proposed formulations without prejudicing the acquisition of broader patent protection. Applicant and its assignee reserve the right to claim additional features such as those which, heretofore, are disclosed only in the specification and/or in the drawings.

The dependencies which are pointed out in dependent claims are indicative of further features of the subject matter recited in the referred to claim or claims, such further features arc intended to be protected jointly with the features recited in the parent claim or claims as well as independently.

In other words, the features which are recited in the dependent claims are considered to constitute, or can constitute, inventions which are or which can be independent from the invention(s) recited in the parent claim or claims.

Furthermore, the invention is not limited to those embodiments which are described in the specification and/or illustrated in the drawings. Thus, the language of the claims is intended to further embrace numerous additional changes and modifications, for example, all those which can be arrived at by combining and/or modifying the illustrated and/or described features in a number of ways and/or by combining the illustrated and/or described features with those which are recited in the claims. This is considered to cover various component parts, combinations of parts, the methods and method steps as well as the procedures of making, testing and/or otherwise treating or processing such parts and the combinations thereof.

What is claimed is:

1. In a motor vehicle, a power train comprising:

a torque supplying prime mover;

a torque receiving device;

an automated system for the transmission of torque between said prime mover and said device, said system having a plurality of different positions of engagement including a starting position;

means for ascertaining said starting position; and means for automatically regulating the transmission of torque by said system, including
a control unit having means for generating output signals denoting the torque to be transmitted and being a function at least of said starting position, and
means for adjusting said system in response to said output signals,
said control unit further including means for memorizing a selected starting position,
means for comparing the selected starting position with the ascertained starting position, and
means for altering said memorized starting position in a stepwise fashion to at least approach the ascertained starting position when the memorized starting position departs from the ascertained starting position.

2. The structure of claim 1, wherein said system comprises a clutch.

3. The structure of claim 1, wherein said system comprises a friction clutch.

4. The structure of claim 1, wherein said starting position is the position of an initial engagement of said system.

5. The structure of claim 1, wherein said ascertained starting position is a position in which said system begins to transmit torque and said means for alerting includes means for altering said memorized starting position in a plurality of steps of predetermined length.

6. The structure of claim 5, wherein said means for alerting is arranged to conform to the memorized starting position.

7. The structure of claim 6, wherein said means for ascertaining said starting position includes means for at least indirectly ascertaining said starting position.

8. The structure of claim 7, wherein said selected starting position is an initial position of engagement of said system.

9. The structure of claim 8, wherein said selected starting position corresponds to at least one starting position determined by said ascertaining means.

10. The structure of claim 8, wherein said selected starting position is indicative of a torque which said system can transmit in said initial position of engagement.

11. The structure of claim 8, wherein the torque which is transmissible by said system is ascertainable from the torque supplied by said prime mover.

* * * * *